United States Patent
Pham et al.

(10) Patent No.: US 7,062,481 B2
(45) Date of Patent: Jun. 13, 2006

(54) ELIMINATING GROUP-BY OPERATIONS IN A JOIN PLAN

(75) Inventors: Son Pham, Northridge, CA (US); Thu K. Pham, Northridge, CA (US)

(73) Assignee: NCR Corp., Dayton, OH (US)

( * ) Notice: Subject to any disclaimer, the term of this patent is extended or adjusted under 35 U.S.C. 154(b) by 583 days.

(21) Appl. No.: 10/259,070

(22) Filed: Sep. 27, 2002

(65) Prior Publication Data

US 2003/0078909 A1    Apr. 24, 2003

Related U.S. Application Data

(63) Continuation-in-part of application No. 09/967,561, filed on Sep. 28, 2001, now Pat. No. 6,757,677.

(51) Int. Cl.
  *G06F 17/30* (2006.01)
(52) U.S. Cl. ............................................. 707/2; 707/5
(58) Field of Classification Search ............... 707/2, 707/3, 4, 5, 6, 7, 10, 202; 709/203
  See application file for complete search history.

(56) References Cited

U.S. PATENT DOCUMENTS 6,757,677 B1 *   6/2004   Pham et al. .................... 707/5

OTHER PUBLICATIONS

Weiping P. Yan et al., Performing Group-By Before Join, University of Waterloo 1993 archive, pp. 1-30.*
Taniar et al., Parallel processing of "GroupBy-Before-Join" Queries in Cluster Architecture, IEEE, May 2001, pp. 178-185.*

* cited by examiner

*Primary Examiner*—Apu M. Mofiz
(74) *Attorney, Agent, or Firm*—Dan Hu

(57) ABSTRACT

A database system includes a storage that contains plural tables as well as a predefined data structure. The database system is able to, in response to a join query, perform a join of two or more tables. The database system also is able to determine, based on values contained in the predefined data structure, whether a group-by operation can be skipped.

20 Claims, 13 Drawing Sheets

For each row in t1 with x1=1 and y1=a, it joins with an identical class of rows of t2 with y2=a.

Solid lines point to group-by attributes
Broken lines are conditions in where-clause and point to the finer Gb attributes

ELIMINATING GROUP-BY OPERATIONS IN A JOIN PLAN

CROSS-REFERENCE TO RELATED APPLICATION

This is a continuation-in-part of U.S. Ser. No. 09/967,561, filed Sep. 28, 2001 now U.S. Pat. No. 6,757,677.

BACKGROUND

A database is a collection of stored data that is logically related and that is accessible by one or more users. A popular type of database is the relational database management system (RDBMS), which includes relational tables made up of rows and columns. Each row represents an occurrence of an entity defined by a table, with an entity being a person, place, or thing about which the table contains information.

To extract data from, or to update, a relational table, queries according to a standard database-query language (e.g., Structured Query Language or SQL) are used. Examples of SQL statements include INSERT, SELECT, UPDATE, and DELETE. The SELECT statement is used to retrieve information from the database and to organize information for presentation to a user or to an application program. The SELECT statement can specify a join operation to join rows of multiple tables. A SELECT statement can also specify that a particular column (or attribute) of a table be aggregated by some specified function, e.g., SUM (to compute the total of a column), AVG (to compute the average value in a column), MIN (to find the smallest value in a column), MAX (to find the largest value in a column), COUNT (to count the number of values in a column), and so forth.

Typically, in response to a SELECT statement that specifies a join of multiple tables in addition to aggregation of one or more attributes of the tables, an optimizer generates a plan that performs the join of multiple tables first followed by the aggregation following the join. An optimizer selects a lowest cost execution or access plan (for a given query) from a plurality of possible plans. The cost is defined as the amount of time and resources needed to perform an execution of the plan.

In performing a join of multiple tables, the intermediate results are typically stored in a spool table. In some cases, the join of multiple tables (such as a product join) can generate a large amount of data. As a result, a spool space problem may be encountered if the spool table becomes too big. Consequently, database system performance may suffer.

SUMMARY

In general, a mechanism is provided to enhance performance during join operations in a database system. In a join query plan for a query with a group-by clause, partial group-by operations are performed to reduce the number of rows of base tables and intermediate spools, thereby reducing processing required in performing the join query plan. To further enhance efficiency, certain of the partial group-operations (including an intermediate partial group-by operation and/or a final group-by operation) can be skipped in response to certain predefined conditions.

Other or alternative features will become more apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
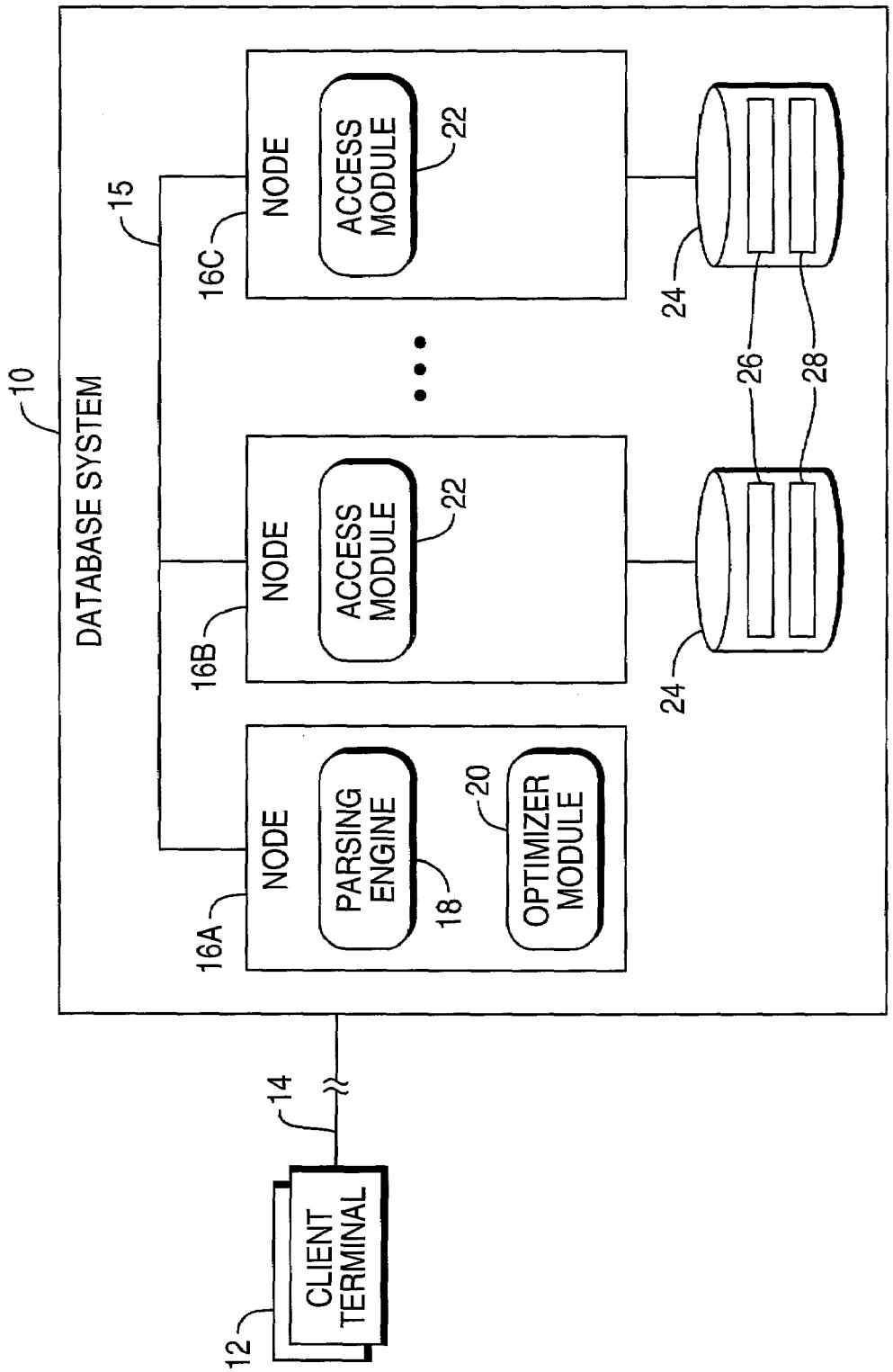
FIG. 1 is a block diagram of an example database system that includes an optimizer module.

FIG. 1 shows a database system 10 that is accessible by one or more client terminals 12 over a network 14. Examples of the network 14 include a local area network (LAN), a wide area network (WAN), or some other type of communications channel. From the client terminal 12, a user or software application is able to issue database queries to extract or manipulate data stored in the database system 10. Such queries are according to a standard database-query language, such as the Structured Query Language (SQL) from the American National Standards Institute (ANSI). One version of SQL is the SQL-92 Standard, while another version is the SQL-99 Standard (also referred to as the SQL-3 Standard).

According to one arrangement, the database system 10 includes a plurality of nodes 16A, 16B, and 16C that are coupled together by an interconnect layer 15. The node 16A is coupled to the network 14, and in the illustrated embodiment, includes a parsing engine (PE) or query coordinator 18. Also, the node 16A includes an optimizer module 20. The parsing engine 18 interprets a query (such as a query received from the client terminal 12), checks the query for proper SQL syntax, and sends out executable steps to be performed by the nodes 16B, 16C. For a given query, the optimizer module 20 selects a lowest cost (or lower cost) execution or access plan from among a plurality of possible plans. In one example, cost is defined as the amount of time and system resources needed to perform an execution plan.

Each of the nodes 16B, 16C includes an access module 22. One example of the access module 22 is the access module processor (AMP) used in some TERADATA® database systems from NCR Corporation. The access module 22 is responsible for managing access to respective portions of the database. As shown in FIG. 1, each access module 22 manages access to data stored in a respective storage module 24. Although shown as discrete components, the storage modules 24 may be part of the same storage subsystem, with the storage modules 24 representing different partitions of the storage subsystem.

In other embodiments, other arrangements of nodes are provided. The various software modules, such as the parsing engine 18, optimizer module 20, and access modules 22 are executable on different nodes.

Each storage module 24 stores one or more tables (also referred to as relations) 26, 28. Because the database system 10 shown in FIG. 1 is a parallel database system that enables concurrent access of different portions of a table, the tables are distributed among plural storage modules 24 corresponding to plural nodes, as shown in FIG. 1.

In a different embodiment, instead of having multiple nodes, the parallel database system 10 is implemented as a single-node multiprocessing system that has plural processors. In yet another embodiment, a uni-processor database system is used.

In accordance with some embodiments of the invention, an alternative method and apparatus of performing joins of plural tables is selectable by the optimizer module 20 in response to queries that contain aggregation function(s) and at least one of a Where clause and a Group-by clause. Examples of aggregation functions include SUM (to compute the sum of a column of values), AVG to compute the average value of a column of values), MIN (to find the smallest value in a column), MAX (to find the largest value in a column), COUNT (to count the number of values in a column), and so forth. A Group-by clause enables query results to be summarized to a "subtotal" level. A Group-by clause in a query, such as a SELECT statement, typically causes several summary rows of data to be produced, with one row for each group (or "class") selected by the Group-by clause. The Where clause specifies a condition (or conditions) of the join rows (or tuples) of multiple tables.

An example SELECT statement that includes aggregation functions, a Where clause, and a Group-by clause is provided below:

|  |  |
| --- | --- |
| SELECT | x1, z1, |
|  | SUM(y1), |
|  | SUM(y3) |
| FROM | t1, t2, t3 |
| WHERE | z1 = y2 AND z2 = z3 |
| GROUP BY | x1, z1; |

This example SELECT statement is referred to as "QUERY 1" in the ensuing description. QUERY 1 specifies a join of tables t1, t2, and t3. Table t1 includes columns (or attributes) x1, y1 and z1, table t2 includes attributes x2, y2, and z2, and table t3 includes attributes x3, y3, and z3. QUERY 1 also specifies an aggregation function SUM(y1) to sum all the values of the attribute y1 and an aggregation function SUM(y3) to sum all the values of attribute y3. QUERY 1 also includes a Where clause that sets the search conditions of the join. In this case, the specified search conditions are z1=y2 and z2=z3. Finally, QUERY 1 includes a Group-by clause to group the join and aggregation results by attributes x1 and z1.

Figure 2:
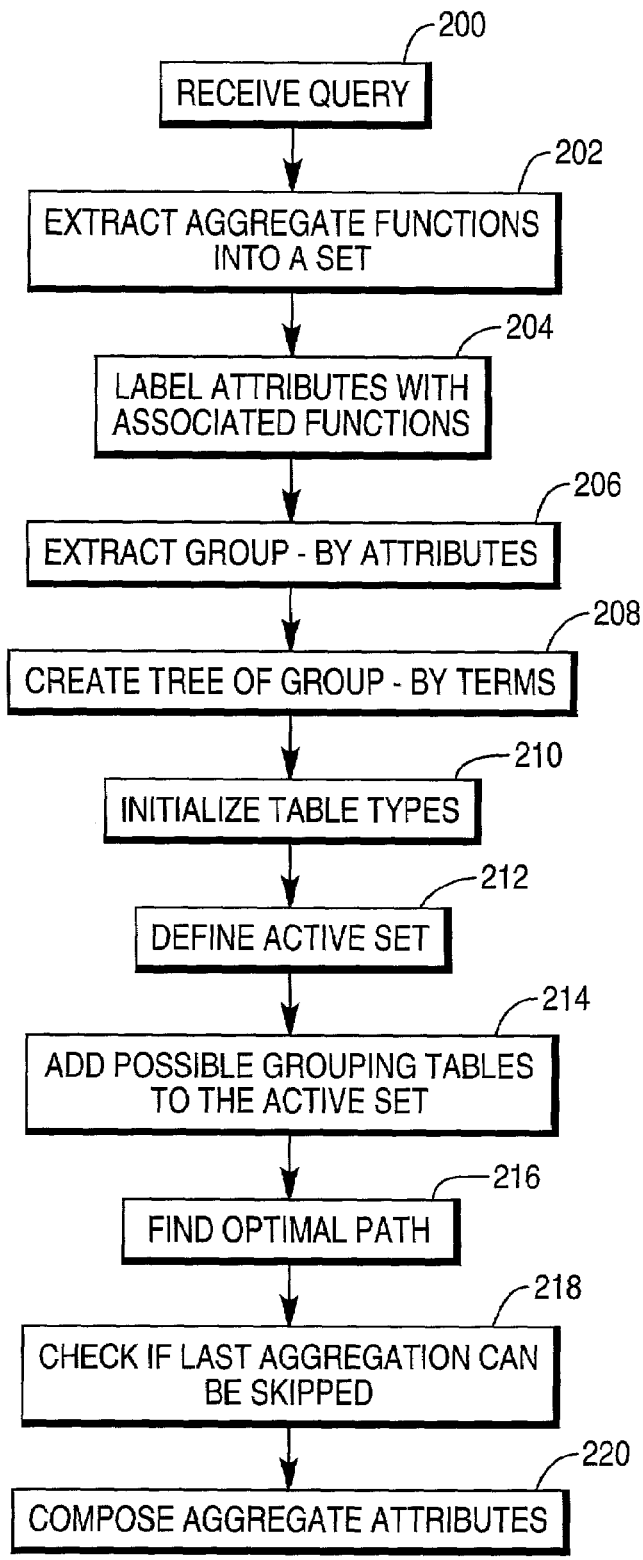
FIG. 2 is a flow diagram of a join plan according to an embodiment of the invention that is selectable by the optimizer module in the database system of FIG. 1.

FIG. 2 shows a process according to one embodiment of performing a join operation in response to a query containing one or more aggregation functions and at least one of a Where clause and a Group-by clause. The process illustrated in FIG. 2 is one example of a "partial group-by join path." In response to a query expression (such as QUERY 1 above) received (at 200), the one or more aggregation functions in the query are extracted (at 202) from the SELECT clause in the query. In QUERY 1, the aggregation functions are the two SUM functions SUM(y1) and SUM(y3). The extracted aggregation functions are placed in a set SetOfAggregations; that is, SetOfAggregations{SUM(y1), SUM(y2)}.

Next, the attributes that are subject to the extracted aggregation functions are labeled (at 204). In QUERY 1, for example, the attributes y1 and y3 are associated with the label SUM. As a result, the following pairs (label, attributes) are produced: (SUM, y1) and (SUM, y3).

Next, the Group-by attributes are extracted (at 206) from the Group-by clause of the received query. Each of these attributes are associated with the label Gb. In the example above, the Group-by attributes include {x1, z1}, each labeled Gb to produce the following pairs (label, attributes): (Gb, x1) and (Gb, z1).

Further, the "finer" Group-by attributes are extracted from the Where clause of the query. These attributes are labeled Gbw. In QUERY 1, the attributes z1, y2, z2, and z3 are labeled Gbw to provide the pairs: (Gbw, z1), (Gbw, y2), (Gbw, z2), (Gbw, z3). The collection of the Gb attributes and Gbw attributes are used to create (at 208) a tree of group-by terms. The tree specifies an order in which the group-by terms are applied.

Next, table types are initialized (at 210). Initially, all tables are of the type "Regular": TableType (all tables) ←Regular. However, another type of table, discussed further below, is the Groupby type, which is used by the optimizer module 20 (FIG. 1) to find an optimal join plan.

Next, an active set of tables is defined (at 212). An active set is a set of active tables with respect to a given table. During optimization, the join path (order of joins on tables) is searched, in which a partial path may be discovered. To continue, the optimizer module 20 finds all possible tables that can be joined to the result of the partial path. This collection of possible tables is called the active set. The active set varies during the search; however, once the search is over, the active set is empty. For example, ActiveSet is set equal to {t1, t1', t2, t2', t3, t4×t5, (t4×t5)', . . . }.

Next, a group-by operation is performed on each table ti, i=1, 2, . . . , with the results of each group-by operation placed into table ti', i=1, 2, . . . . The Groupby table ti' is added (at 214) to the active set. The group-by operation on ti to produce ti' is expressed by the following query:

ti'←select Gb Attributes, Gbw Attributes, aggrFunction (attribute),

COUNT(*)

from ti where table-conditions(ti)

group by Gb Attributes(ti), Gbw Attributes(ti);

Gb Attributes(ti) represent the attributes of table ti extracted from the Group-by clause of the query, Gbw Attributes(ti) represent the attributes of table ti extracted from the Where clause of the query, and aggrFunction (attribute) represents the aggregate function performed on an attribute of table ti. In one example, the function SUM performed on attribute y1, referred to as SUM(y1), is designated as attribute sumy1. The COUNT(*) function counts the number of rows of a query result, in this case result table ti'. An attribute cti is used to represent COUNT (*) for table ti. The set table-conditions(ti) contains all conditions in the Where clause of the original queries that affects table ti. The Group-by clause contains Gb Attributes (ti) and Gbw Attributes(ti).

Next, an optimal path is identified (at 216) based on an active set of tables. During the optimization process performed by the optimizer module 20, a partial path with a low cost is discovered. A result table storing the join of two other tables has attributes (possibly modified) from the joined tables in addition to additional attributes. When a binary join is committed by the optimizer module 20, input tables to the join are removed from the active set. The Groupby tables associated with those input tables are also removed from the active set. When a new join table is added to the active set, its prime counterpart (the Groupby version of the new join table) is also added if there are aggregations on the join results.

Once the join of all tables has been performed, the optimizer module 20 next checks (at 218) to determine if a group by of the result (referred to as the "last relation") is needed. If rows of the last relation are unique, then nothing further needs to be done. In other words, the last aggregation can be skipped. The last relation is unique if it has all rows different on the group-by condition specified in the base query. However, if the rows of the last relation are not unique, then a group by of the last relation on the attributes in the Group-by clause of the base query is performed. As further discussed below in conjunction with FIGS. 15 and 16A–16B, a predefined data structure can be used for determining whether the group by of the result can be skipped.

If the base query specifies an aggregation function that is performed on an expression (in which multiple attributes are mathematically combined), then the optimizer module 20 composes (at 220) the aggregate attributes on the result using expression trees and types of attributes. For example, the attribute function SUM(x1+3x2) divided by (4*x5) is an aggregate function that works on an expression involving x1, x2, and x5. The expression is represented as a tree.

The example query (QUERY 1) noted above is reproduced below:

|           |                      |
|-----------|----------------------|
| SELECT    | x1, z1,              |
|           | SUM(y1),             |
|           | SUM(y3)              |
| FROM      | t1, t2, t3           |
| WHERE     | z1 = y2 AND z2 = z3  |
| GROUP BY  | x1, z1;              |

Conventionally, a join path that is provided by conventional optimizers is to perform a merge join of rows of tables t2 and t3 to satisfy the join condition z2=z3, with the result going into a spool table (referred to as Spool 2). Spool 2 and table t1 are then joined using a merge join that satisfies the join condition of z1=y2, with the result going into another table (Spool 3). A SUM step is then performed to aggregate from Spool 3.

In accordance with some embodiments of the invention, the optimizer module 20 is able to select the conventional join path or the partial group-by join path discussed in connection with FIG. 2, depending on which plan is the optimal plan in terms of cost.

The partial group-by join operation for QUERY 1 can be expressed as follows. The first task is to perform a partial group by of tables t1, t2, and t3 (212 in FIG. 2)
CREATE VIEW v1 (x1, sumy1, z1, ct1) AS
  SELECT x1, SUM(y1), z1, COUNT(*)
  FROM t1
  GROUP BY x1, z1;
CREATE VIEW v2 (y2, z2, ct2) AS
  SELECT y2, z2, COUNT(*)
  FROM t2
  GROUP BY y2, z2;
CREATE VIEW v3 (sumy3, z3, ct3) AS
  SELECT SUM(y3), z3, COUNT(*)
  FROM t3
  GROUP BY z3;

In the example above, the group by of each table ti is placed into a view vi. Thus, the group by of table t1 is placed into view v1, the group by of table t2 is placed into view v2, and the group by of table t3 is placed into view v3.

Figure 3:
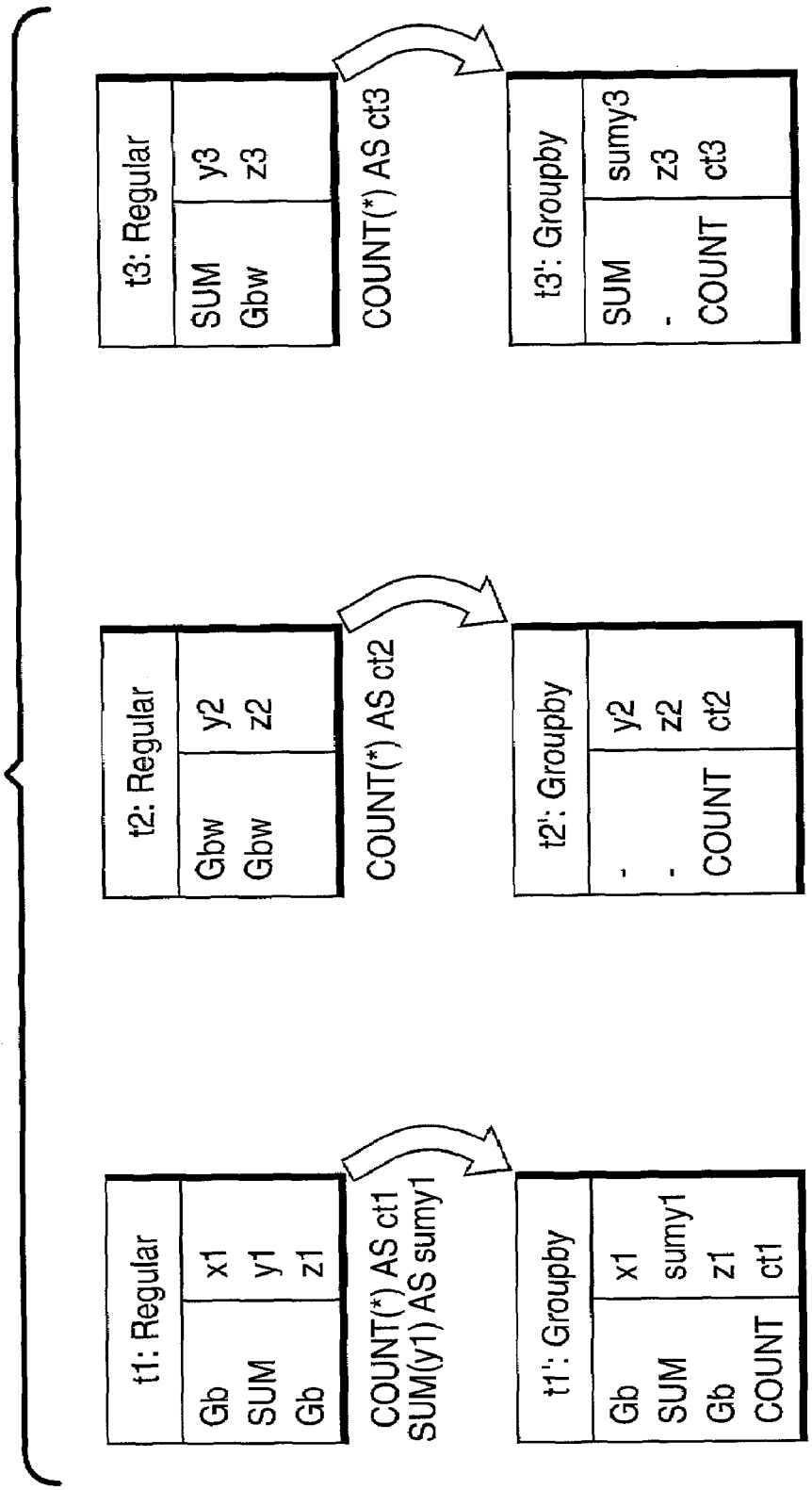
FIG. 3 illustrates partial group-by operations of base tables that are the subject of a query executable in the database system of FIG. 1.

Next, views v1, v2, and v3 are joined, with the result placed into view v123, as represented by the CREATE statement below:
CREATE VIEW v123 (x1, sumy1ct2ct3, z1, sumy3ct1ct2) AS
  SELECT x1, sumy1*ct2*ct3, z1, sumy3*ct1*ct2
  FROM v1, v2, v3
  WHERE z1=y2 and z2=z3;

A group by on the view V123 is then performed, which is a group by based on attributes x1, z1.
  SELECT x1, z1, SUM(sumy1ct2ct3), SUM(sumy3ct1ct2)
  FROM v123
  GROUP BY x1, z1;

The partial group by of the base tables (t1, t2, and t3) are illustrated in FIG. 3. Table t1 has Gb attributes x1 and z1 and attribute y1 is associated with the label SUM. A partial group by of table t1 is performed on the attributes x1 and z1. In performing the group by of table t1, the function COUNT(*), which counts the number of rows in t1', is placed into attribute ct1 and the aggregate function SUM(y1) is placed into sumy1. The Groupby table t1' has Gb attributes x1 and z1, the attribute sumy1 associated with the label SUM, and the attribute ct1 associated with the label COUNT.

The base table t2 has Gbw attributes y2 and z2, which appear in the Where clause of QUERY 1 above. A partial group by of table t2 is performed on the attributes y2 and z2. As part of the group-by operation, the ct2 attribute is defined to store the output of COUNT(*). The Groupby table t2' (generated from a partial group by of base table t2) has attributes y2 and z2 (originally in the Where clause of QUERY 1) that are not associated with any labels since a group by of those attributes will not be performed in later joins. The attribute ct2 is associated with the label COUNT.

The base table t3 has a Gbw attribute z3 and an attribute y3 associated with the label SUM. A partial group by of table t3 is performed on the attributes y3 and z3. In the group-by operation, an attribute ct3 is defined to store the output of COUNT(*). Also, an attribute sumy3 is defined to store the output of SUM(y3). Thus, the Groupby table t3' has an attribute sumy3 associated with the label SUM, and an attribute ct3 associated with the label COUNT. The attribute z3 is not associated with any label since further operations are not needed with respect to z3 (which appeared in the Where clause of QUERY 1).

Figure 4:
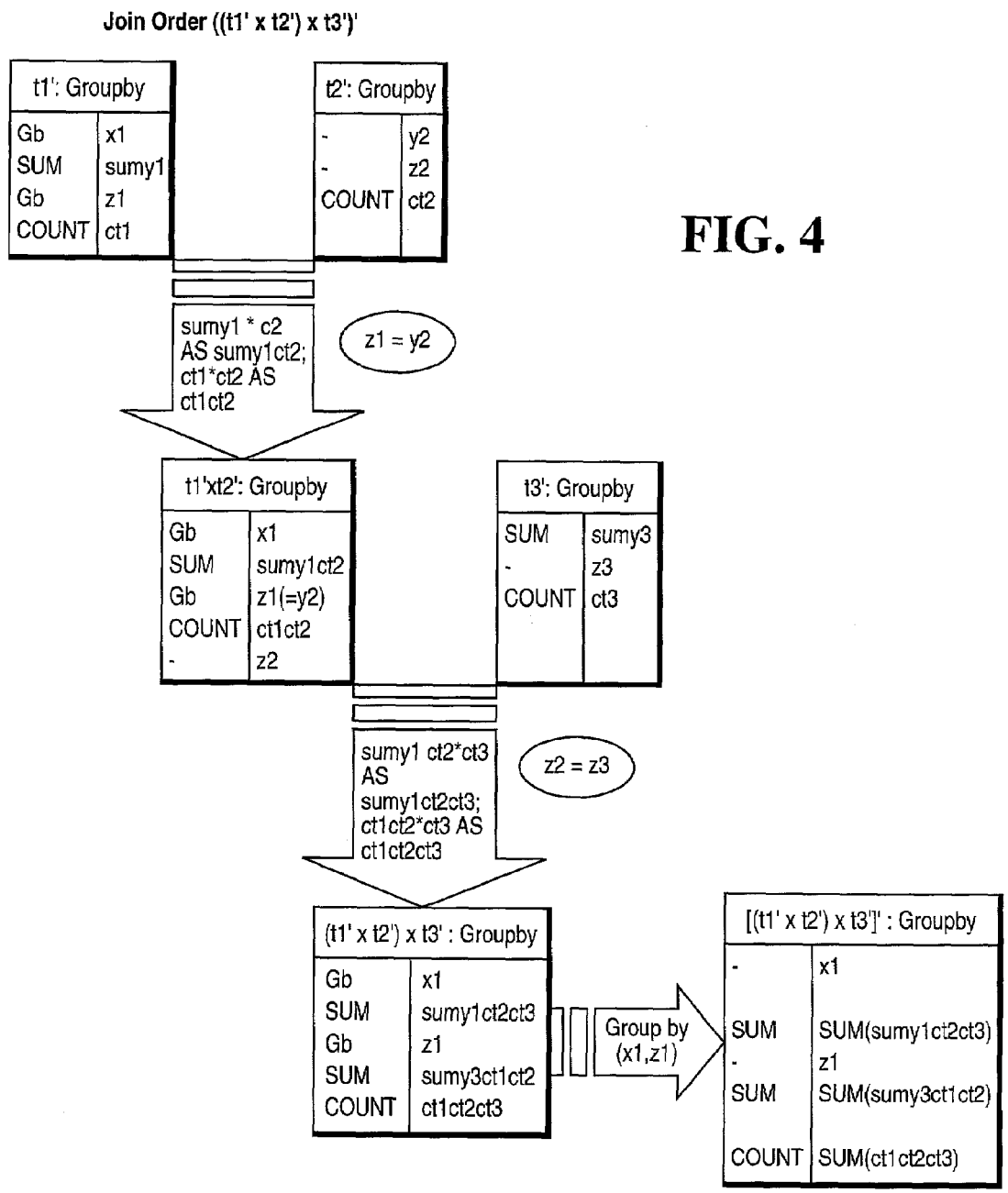
FIGS. 4 and 5 illustrate different join orders involving partial group-by operations.
Figure 5:
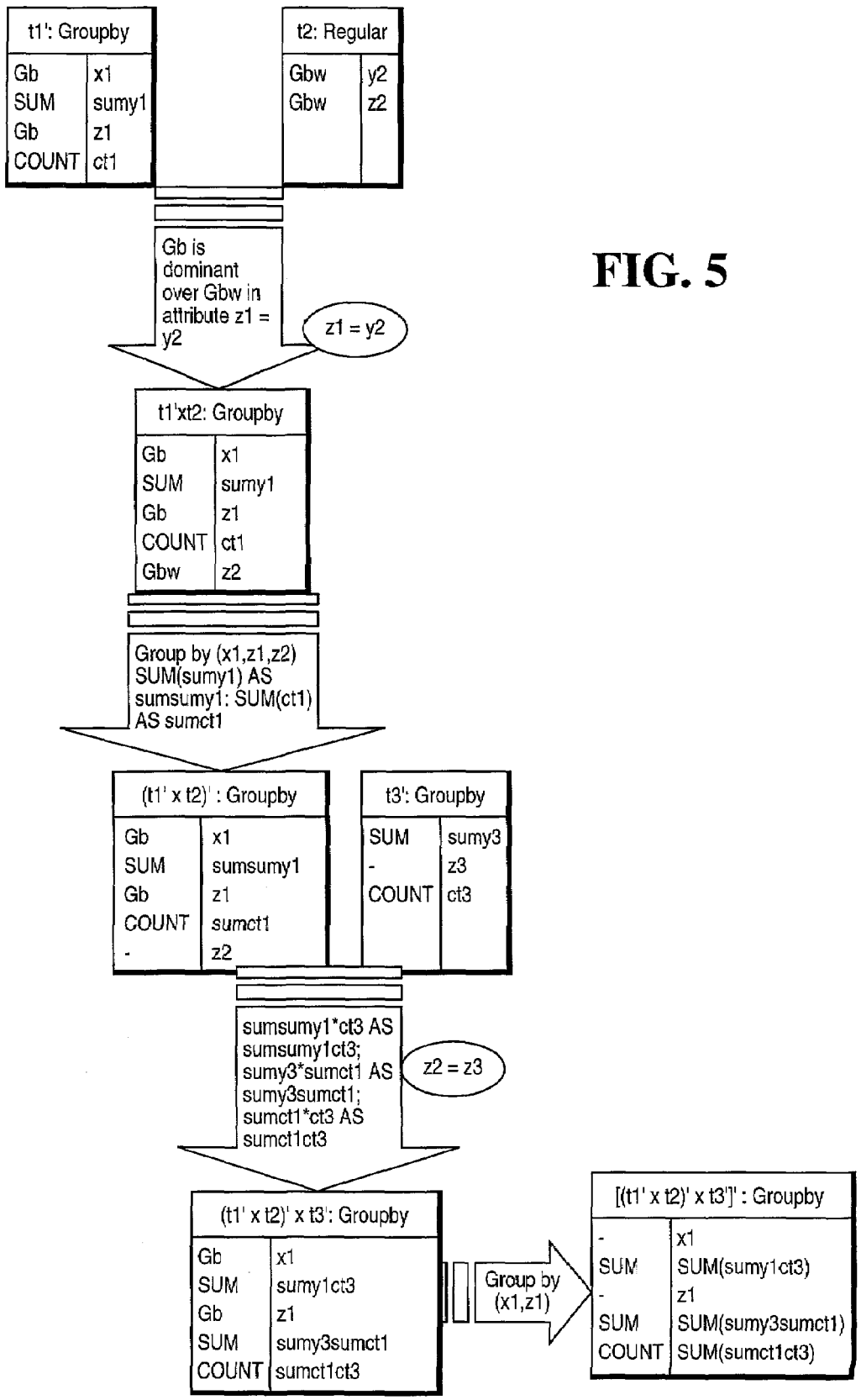

FIGS. 4 and 5 illustrate two different join orders that are selectable by the optimizer module 20. FIG. 4 illustrates the join order ((t1'×t2')×t3')', while FIG. 5 illustrates the join order ((t1'×t2)'×t3')'. The join order of FIG. 4 first joins t1' with t2', followed by the join of (t1'×t2') with t3'. The join order of FIG. 5 first joins the Groupby table t1' with Regular base table t2, with a partial group by performed on the result (t1'×t2) to produce (t1'×t2)'. A join is then performed of (t1'×t 2)' with Groupby table t3'.

As shown in FIG. 4, tables t1' and t2' are first joined with the join condition z1=y2. When joining Groupby tables, a cross-augmented join is used. A cross-augmented join is a regular binary join except that the SUM-type attribute (or other type of aggregate attribute) on one table is augmented (or multiplied) by the COUNT-type attribute of the other table, and the COUNT-type attribute of one table is augmented (or multiplied) by the COUNT-type attribute of the other table. If a table has no COUNT-type attribute, the default value is one.

Thus, in the example of FIG. 4, the join of table t1' and table t2' is an augmented join, in which the attribute sumy1 is multiplied by ct2 (to produce sumy1ct2), and ct1 is multiplied by ct2 (to produce ct1ct2). The resultant Groupby table t1'×t2' is then joined (using a cross-augmented join) with table t3' with the join condition z2=z3. Here sumy1ct2 is multiplied by ct3 into sumy1ct2ct3, and ct1ct2 is multiplied by ct3 to produce ct1ct2ct3. Also, the attribute sumy3 in table t3' is multiplied by the attribute ct1ct2 in the table t1'×t2' to produce sumy3ct1ct2. The result is a Groupby table (t1'×t2')×t3'.

A group by on attributes x1 and z1 is then performed on this table, if necessary, with the result represented as [(t1'×t2')×t3']'. The SUM( ) function is applied on the attribute sumy1ct2ct3, as indicated by SUM(sumy1ct2ct3), and is also applied on the attribute sumy3ct1ct2, as indicated by SUM(sumy3ct1ct2). The results of the SUM( ) functions referenced above are associated with the label SUM. In addition, the SUM( ) function is also applied on ct1ct2ct2, with the results associated with the label COUNT. Note that the COUNT attribute SUM(ct2ct2ct3) is not really necessary in the final result of the table, but is left to show a consistent pattern in joining to create a data structure of the table result. Also, if the COUNT attribute is requested in a submitted query, the field can be produced.

Note that the results produced are x1, z1, SUM (sumy1ct2ct3), and SUM(sumy3ct1ct2) grouped by x1 and z1, which correspond to the result of the original query (QUERY 1).

In FIG. 5, which uses a different join order, the table t1' (Groupby table) is joined with table t2 (Regular table). The cross-augmented join is performed to produce t1'×t2 with the join condition being z1=y2. The attribute z1 is of type Gb, and the attribute y2 is of type Gbw, with z1=y2. Note that Gb is dominant over Gbw, so that the attribute z1(=y2) in table t1'×t2 is of type Gb. The resultant table t1'×t2 is a Groupby table, which includes Gb attributes x1 and z1, the attribute sumy1 having the label SUM, the attribute ct1 having the label COUNT, and the Gbw attribute z2.

A group by is then performed on t1'×t2 on (x1, z1, z2) to produce a table (t1'×t2)', which has Gb attributes x1 and z1. Also, in the table (t1'×t2)', the attribute z2 is no longer associated with any label. The value of SUM(sumy1 ) is placed into sumsumy1, and the value of SUM(ct1) is placed into sumct1.

A cross-augmented join is performed on table (t1'×t2)' and table t3', with the join condition z2=z3. The product of sumsumy1 and ct3 is placed in sumsumy1ct3, the product of sumy3 and sumct1 is placed in sumy3sumct1, and the product of sumct1 and ct3 is placed in sumct1ct3.

The join produces the table (t1'×t2)'×t3', which has Gb attributes x1 and z1, SUM attributes sumy1ct3 and sumy3sumct1, and COUNT attribute sumct1ct3. A partial group by on x1 and z1 is then performed on this table, if necessary, with the result placed into [(t1'×t2)'×t3]'. In the Groupby table [(t1'×t2)'×t3']', the functions SUM (sumy1ct3), SUM(sumy3sumct1), and SUM(sumct1ct3) are calculated, which correspond to the results, along with x1 and z1, grouped by x1 and z1.

By performing partial group by on at least one of the tables of a join operation, and optionally performing partial group by on intermediate results, a smaller number of rows of each table (base table and/or intermediate table) is involved in the join operation. This reduces the amount of spool space needed to store intermediate results. The partial group-by join operation according to some embodiments is considered by the optimizer module 20 as one of the execution plans that can be selected based on a comparison of costs of several possible plans.

Conventionally, an optimizer finds an optimal path for a join based on costs of binary joins on the base tables and intermediate join results. However, according to some embodiments, group-by operators on each individual table (or relation) are considered. The group-by operator is a unary operator on a table, while a join is a binary operator. Thus, the decision to be made by the optimizer module 20 according to some embodiments is to determine when to join first or group-by first, which depends on the cost of each choice.

Figure 6:
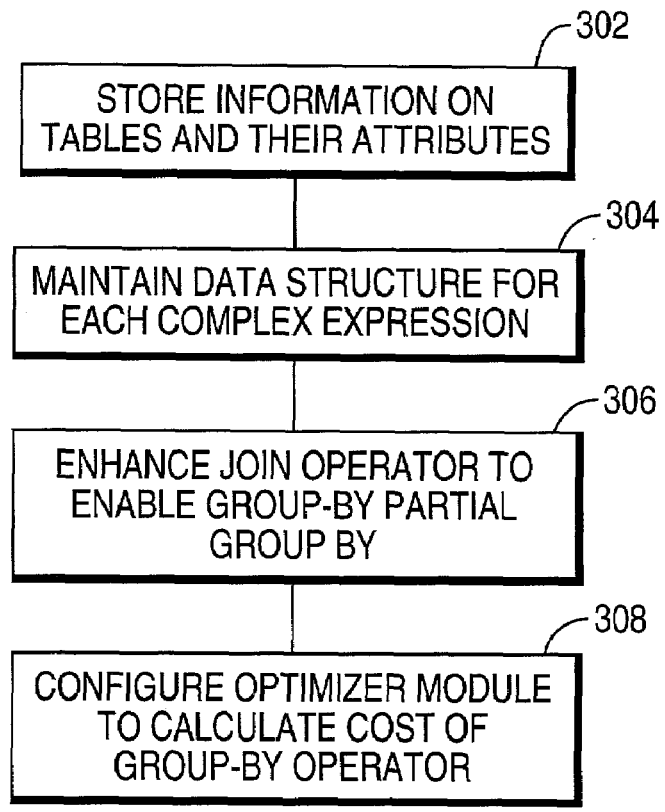
FIG. 6 is a flow diagram of acts performed in the database system of FIG. 1 to enable partial group-by operations.

As shown in FIG. 6, to enable the optimizer module 20 to consider partial group by's, various enhancements are provided. One is to store information regarding each relation and its attributes (at 302). Each relation is of type Regular or Groupby. Each attribute has an associated label: blank (no type), Gb, Gbw, or aggregation (e.g., SUM, AVG, etc.). These labels are stored along with the table.

In addition, a data structure is maintained (at 304) for each complex expression operated upon by an aggregation function. In one embodiment, the data structure is a tree structure representing the expression. The basic aggregations are collected on the attributes with the data structure used to compose the aggregations at the final step when the join result is found.

Another enhancement is to modify (at 306) the join operator by augmenting an aggregate attribute (e.g., SUM attribute, AVG attribute, etc.) of one relation with the count attribute of the other relation. Also, the count attribute of one relation is augmented by the count attribute of the other relation.

The optimizer module 20 is also configured (at 308) to calculate the cost of a group-by operation, such as on a base relation or an intermediate relation, to determine costs during a search for an optimal plan by the optimizer module 20.

The following describes the theory underlying the partial group-by process discussed above. Each attribute of a base table is associated with a type determined by the query. As noted above, the types include: Gb (for an attribute specified in the Group-by clause of a query); Gbw (for an attribute specified in the Where clause); SUM (for an attribute on which the aggregation function SUM is applied in the Select clause); MIN (for an attribute on which the aggregation function MIN is applied in the Select clause); MAX (for an attribute on which the aggregation function MAX is applied in the Select clause); COUNT (for an attribute on which the aggregation function COUNT is applied in the Select clause); and blank otherwise.

If two attributes of different types are equally linked in a condition, one of them is selected with the following priority: Gb>Gbw>blank. The type with the higher priority is referred to as to being "dominant," and the type with the lower priority is referred to as being "recessive." After a join, the attribute has the dominant type, with the recessive attribute being masked by the dominant type. Note that AVG is considered as either type SUM or COUNT.

If one attribute (e.g., x1) has two different aggregation functions associated with it, such as MAX and SUM, then the attribute is duplicated and assigned to both types. Thus, if attribute x1 has aggregation functions MAX and SUM applied on it, then pairs (MAX, x1) and (SUM, x1) are defined.

In addition to defining attribute types, table types are also defined. Tables specified in the From clause of a query are of the Regular type. Join results of a query are also of the Regular type. The partial group-by operator can apply on a table or a join result, with the resultant table being of the Groupby type. Given two tables u and v, the following formula determines the type of the result table from a join of the table's u and v: Type(u×v) equals Type(u) AND Type(v). A Boolean TRUE indicates a Regular-type table and a Boolean FALSE indicates a Groupby-type table. Thus, a join table is Regular only if both table's u and v are Regular; otherwise, the join table is of the Groupby table.

The attribute x of Type Gb is denoted by (Gb, x). Similarly, other designations (Gbw, x), (SUM, x), (MAX, x), (MIN, x), and (COUNT, x) are provided for the other types.

The partial group-by operator is referred to as GbOp. As noted above, a partial group by may be performed on each table that is to be joined by a query, depending on the plan selected by the optimizer module 20. Given a query Q, let Chr(Q, t) be the characteristic of the table t. The operator GbOp on t is defined with the notation GbOp(t)=t':

SELECT (GbSet(t)∪GbwSet(t)∪Aggregation functions specified in Q,
count(*))
FROM t
WHERE (only conditions using attributes of t)
GROUP BY GbSet(t)∪GbwSet(t);

The resulting table GbOp(t) has the following characteristics. The table type is Groupby. The aggregation sequence is formed by the aggregations SUM, MAX or the like on each attribute. Moreover, a COUNT aggregation function is added. The group-by sequence is the same as the table before the operation, or the group-by sequence can be dropped depending on the original query as discussed further below. An "extra" group-by sequence is dropped (that is, the Gbw type becomes blank). A group by of a table on a finer attribute (Gbw attribute) is referred to as an extra group-by sequence.

The GbOp operator does not apply on every table. A group-by operator does not apply on a table if there is a blank attribute; that is, the attribute that is not of the type Gb, Gbw, or aggregation. The GbOp operator can be applied on regular tables. Also, the GbOp operator can be used on a Groupby table with a finer set of attributes than the one of the query. A finer set is defined as a super set, the set that contains all attributes specified in the Group-by clause and Where clause of the base query. In other words, the finer set includes both Gb and Gbw attributes.

When the group-by operator is applied on a table, the result table has an updated data structure. The group-by sequence is dropped (no group by) if the group-by sequence is one of two cases: (1) the extra group-by sequence is applied on the same attribute; and (2) the attributes in the group-by sequence and the extra group-by sequence are equal to the attributes in the Group-by clause of the base query.

As noted above, a cross-augmented join is performed on tables where at least one of the tables is a Groupby table. A cross-augmented join is a regular join except that the SUM-type attribute in one table is multiplied (augmented) by the COUNT-type attribute of the other tables; and the COUNT-type attribute of one table is multiplied (augmented) by the COUNT-type attribute of the other table. If a table has no COUNT-type attribute, the default value for COUNT is one.

The augmented join result has the following characteristics. The join table type is Regular if both tables are Regular; otherwise, the join table is of the Groupby type. The attribute type is inherited from the two given tables. Assume two views: v1(x1, y1, z1, aggr1, ct1) and v2(x2, y2, z2, aggr2, ct2), where aggr1 and ct1 are generated by SUM and COUNT on a table t1; and aggr2 and ct2 are generated by SUM and COUNT on a table t2. The augmented join between v1 and v2 is defined as a regular binary join between them except the attribute aggr1 is replaced by aggr1*ct2, the attribute aggr2 is replaced by aggr2*ct1, and the attributes ct1 and ct2 are replaced by ct1*ct2.

In summary: Augmented join(v1, v2)=join(v1, v2) (x1, y1, z1, aggr1*ct2, x2, y2, z2, aggr2* ct1, ct1*ct2). The attributes aggr1*ct2 and aggr2*ct1 are of type SUM, and the attribute ct1*ct2 is of type COUNT.

Given two sets A and B of attributes, if A⊆B, then the group by on B is finer than the group by on A. This is referred to as "Lemma 1." That means the group by on B yields more rows than the group by on A. Moreover, the further group by on A of the group by on B has an identical result of group-by A. Mathematically, if t is a table, then Group-by on B (t)⊇ Group-by on A(t).
Group-by on A (Group-by on B (t))=Group-by on A(t).

The group by on B groups or sorts all rows using attributes in B before an aggregation is performed. Since B is larger than A, the set of rows with a constant value in B is the subset of rows with the same constant in A. Hence, group-by B is a finer partition of group-by A.

Given two tables t1 and t2, the following proposition (referred to as "Proposition 1") is correct:

(t1×t2)'=(t1'×t2')'
(t1×t2)'=(t1'×t2)'

This provides flexibility in how the tables are joined to achieve the final join result. The optimizer module 20 can thus choose among plural join paths that involve Groupby tables.

Figure 7:
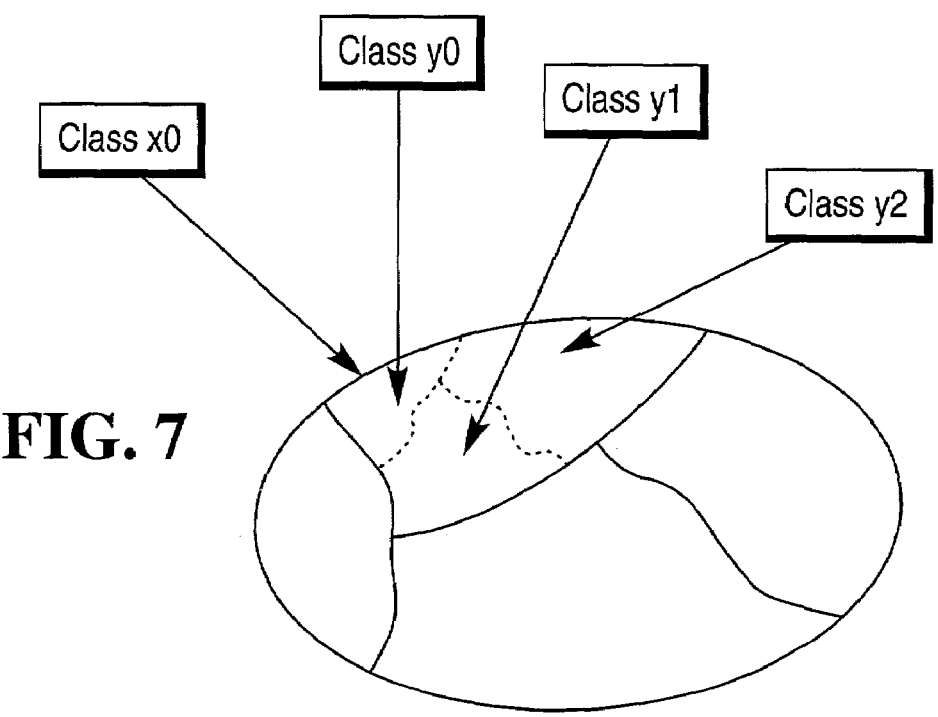
FIG. 7 illustrates the partition of a given class in a table into sub-classes.

Given a table t, a group by on attribute x is a partition of the rows into the classes of the same value in x. If the table is group-by in (x, y), this partition is finer than the one on x. That means if the set of rows are partitioned by x, then the classes of the same x value exist. Within each class x, a further partition can be performed on y. Hence, it is equivalent to partition the set by the pair (x, y). In the class of x=x0, where x0 is a constant, a partition on y is provided as y=y0, y1, y2, . . . , y$_{x0}$, as illustrated in FIG. 7. The aggregation SUM on any attribute (e.g., z) where x=x0 is given by the formula:

$$\sum_{z\varepsilon\ Class\ x=x0} Value(z) = \sum_{yi=y0,y1,y2,\ldots\ y_{x0}} \sum_{z\varepsilon\ Class(x=x0,y=yi)} Value(z)$$

Figure 8:
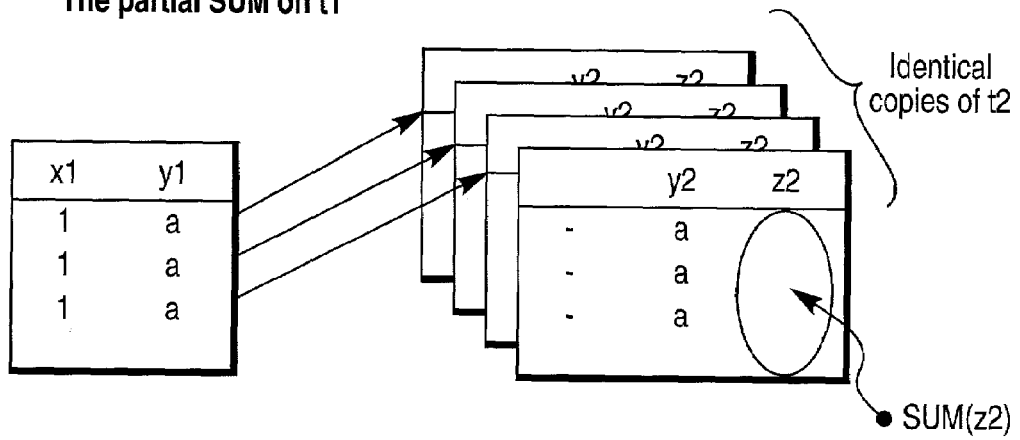
FIGS. 8 and 9 illustrate the calculation of partial sums on tables.

The following proves the simplest case of t1(x1, y1, z1) and t2(x2, y2, z2). Assume there is only one condition y1=y2 in the Where clause of a base query, and the group by is performed only on x1, and the SUM is on z2. Here is the select statement of the example base query:

SELECT x1, SUM (z2),
FROM t1, t2
WHERE y1=y2
GROUP BY x1;

Consider a constant value of x1 on which the group by is applied. Without loss of generality, for all rows with x1=1, a partition on y1 is used. Let a, b, c, . . . be the values of y1. It is desired to find the rows of (t1×t2) under the conditions x1=1 and y1=y2=a. These rows are equivalent to the rows of t1 with x1=1 and y1=a joining with the rows of t2 with y2=a. This is graphically shown in FIG. 8.

For each row in t1 with x1=1 and y1=a, the row joins with an identical class of rows of t2 with y2=a. Hence, the SUM of z2 on all (1, a) of the cross product is SUM(z2)*ct1, where SUM(z2) is the total of z2 in one copy of the class with y2=a, and ct1 is the number of rows of t1 with x1=1 and y1=a.

Thus, the result is (1, a, $SUM_a(z2)$*count(1, a)). Similarly, for y2=b, the result is (1, b, $SUM_b(z2)$*count(1, b)), and for y2=c, the result is (1, c, $SUM_c(z2)$*count(1, c)). However, the base query is grouped by on x1 only, and thus y2 should not be collected (to avoid a violation of group-by operator). Here the result is group by in (x1, y1). Therefore, a group by is performed one more time on x1 to get:

(1, $SUM_a(z2)$*count(1, a)+$SUM_b(z2)$*count(1, b)+$SUM_c$(z2)*count(1, c)).

The following discusses a case of two conditions in the Where clause of the query. Consider t1(x1, y1, z1) and t2(x2, y2, z2, w2), group by on x1, but under the composite condition "y1=y2 and z1=z2", and SUM on w2. From t1, a group by of rows on x1 is performed. Without loss of generality, in the rows with x1=1, a partition is performed on y1. Assume the different values are a, b, c, and so forth. Within the class of rows x1=1, y1=a, a partition is performed again on z1 into the different values, assume r and s (choose two values for simplicity).

Figure 9:
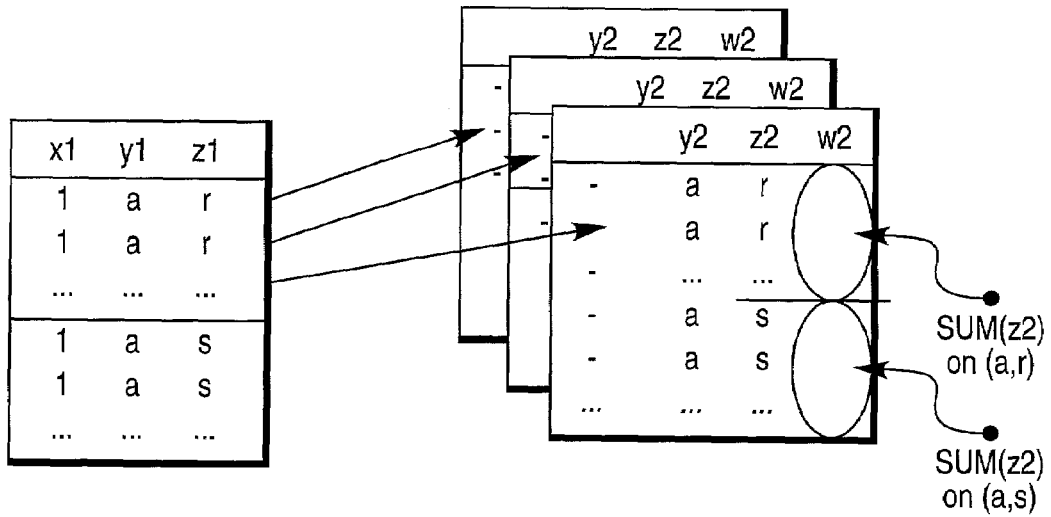

On t2, a group by is also performed of the rows on y2, with the values a, b, c, and so forth, then on z2, with the values r and s. This is graphically shown in FIG. 9.

After the cross product, the following rows are created:
1, a, r, $SUM_{a,r}(z2)$*COUNT(a, r),
1, a, s, $SUM_{a,s}(z2)$*COUNT(a, s),
1, b, r, $SUM_{b,r}(z2)$*COUNT(b, r),
1, b, s, $SUM_{b,s}(z2)$*COUNT(b, s),
and so forth.

A SUM for x1=1 is then performed to obtain the result.

The COUNT function maintains the repetition of identical rows from each table. In a join, it is the product of the two joined tables. Some properties of COUNT(*) are as follows. COUNT is unique in each table. Hence, there is at most one attribute of type COUNT within the characteristics of each table. If the initial base table does not have a COUNT-type attribute, it is initialized to 1. COUNT(*) is accumulated during the progressive joins along the join path. The COUNT from a table is used to augment the SUM type of other tables. Attribute names of COUNT are named by the prefix ct followed by the table number. For example, ct1 and ct2 are COUNT(t1) and COUNT(t2), respectively. After the join of t1 and t2, ct1 and ct2 are updated to ct1*ct2 with a new attribute name by concatenating the two previous names: ct1ct2. This is of COUNT type also.

The optimizer module 20 in general searches for a join path on the active set of base tables. Since Proposition 1 (referred to above) provides alternative ways to group by first and join later, the optimizer module 20 now can find a join path from a larger active set that includes the base tables and their respective group-by's. In addition, the augmented join enhances the regular join to enforce the same result of the query. Indeed, the augmented join updates certain attributes (such as attributes of type SUM or other aggregate type) by COUNT(*). This is done to carry the table types and attribute types so that the optimizer module 20 can produce a better join path.

Based on the characteristics of the tables, GbOp (the partial group-by operator) is applied on each table to group by on the Gb and Gbw attributes. Since this group by is partial, the join result may require a further group by. Moreover, a join is not restricted on group-by tables GbOp (t), but instead, the join can apply on base tables or between a base table and a group-by table. This provides the optimizer module 20 with much more freedom in searching for a lower cost path in performing a binary join. Therefore, two issues should be considered to enhance further the search for a better path: (1) Whether a group-by operator can apply recursively on a non-base table such as the join result; and (2) when the group-by operator is dropped during the optimization (termination of the local group-by). As soon as the above two issues are answered positively, the validity of the algebra of the query can be addressed.

A select statement with a Group-by clause involving a single table is considered. The statement is considered invalid if the selected non-aggregate values are not part of the associated group. For example, the query SELECT x2, z2, r2, SUM(y2), COUNT(*)
FROM t2
GROUP BY z2, r2;

is invalid because the associated group is {z2, r2} while the non-aggregate values are x2, z2, and r2. When the query is determined invalid, the optimizer module 20 stops and a message is provided to the user to submit a correct query.

The following proposition ("Proposition 2") is defined. Given a table (base or non-base) with its characteristic, the Group-by operator can apply on the table if and only if (Gb set)∪(Gbw set)∪{Aggregate attributes}=set of all attributes in the characteristics.

In other words, the attributes of the tables must be of type Gb, Gbw, or Aggregate function.

The following corollary ("Corollary 1") follows. Given a select statement on multiple tables with a Group-by clause, the group-by operator can be applied on each table using its characteristics.

The following corollary ("Corollary 2") also follows. If a table t has a Gbw type (i.e., Gbw(t)≠φ), the group-by operator cannot apply on GbOp(t)=t'. For example, let x be an attribute of type Gbw. As discussed above, the characteristics of GbOp(t) have x of type Blank. This does not satisfy the condition of Proposition 2 above.

Given two tables u and v, the following proposition ("Proposition 3") is true. If both tables are of type Regular, the group-by operator can apply on the augmented join of u and v. That means (u×v)' is possible. If only one table is of type Regular (assume u is such table without loss of generality), (u×v)' is possible if all blank attributes of v are masked by Gb or Gbw attributes of u via conditions of the join. If both tables are non-Regular, (u×v)' is possible if all Blank attributes of a table are masked by Gb or Gbw attributes of the other table via the conditions of the join. In other words, the blank attributes of u are masked by Gb or Gbw attributes of v by some join conditions, and the blank attributes of v are masked by Gb or Gbw attributes of u by some join conditions.

If u and v are of type Regular, Corollary 1 indicates that both satisfy Proposition 1. By the definition of augmented join, u×v also satisfies Proposition 1. Hence, GbOp is possible on u×v. Also, as note above, the recessive attribute is masked by the dominant one via a join condition, which makes a blank attribute non-blank. Hence, u×v satisfies Proposition 2.

The following discusses the necessary and sufficient conditions to apply the group by operator GbOp to the base or non-base tables. If the optimizer module 20 is able to detect in advance that a group by is no longer needed under some conditions, the optimizer module 20 is able to determine when to not consider GbOp any longer and focus only on the joins. If the characteristics of the intermediate table no longer have attributes with types Gb or Gbw, performance of partial group-by operations is disabled.

Let Q be a base query and GbSetOfQuery be the set of attributes within the Group-by clause of the base query. If the GbSetOfQuery set contains a primary key, then the Group-by clause can be omitted without changing the result of the query. This concept is also true for a candidate key—a generalization of primary key on multiple attributes to distinguish all rows. In a parallel database system, plural data server nodes are present to manage concurrent access to plural storage modules. A table is distributed across the storage modules. A primary key is used to determine how rows of the table are distributed across the nodes. A candidate key is a collection of columns (or attributes) of a table that in combination distinguish all rows of the table and the collection is a minimal set.

If GbSetOfQuery contains a primary key or a candidate key, the attributes Gb and Gbw can be changed to the blank type.

Figure 10:
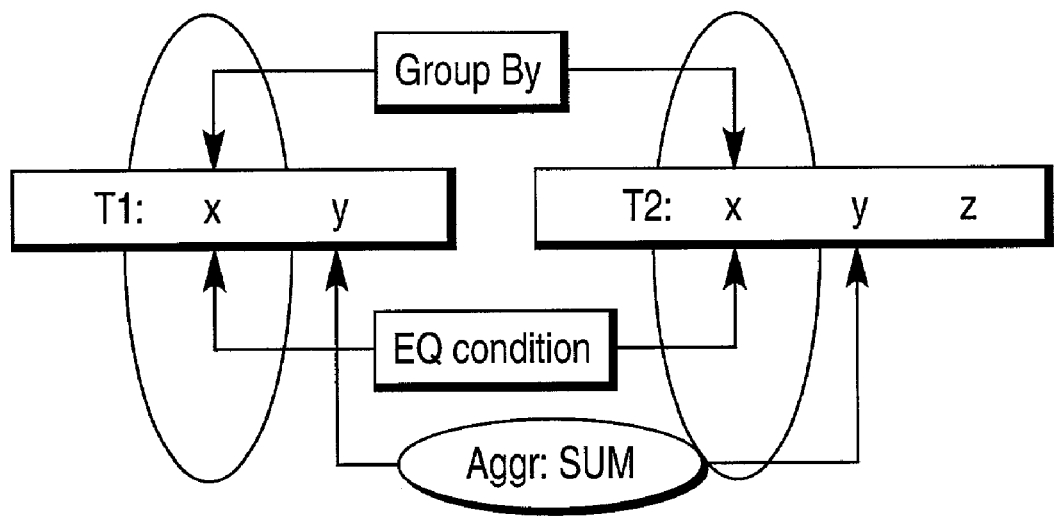
FIGS. 10–12 illustrate example cases in which group-by operations are needed or not.
Figure 11:
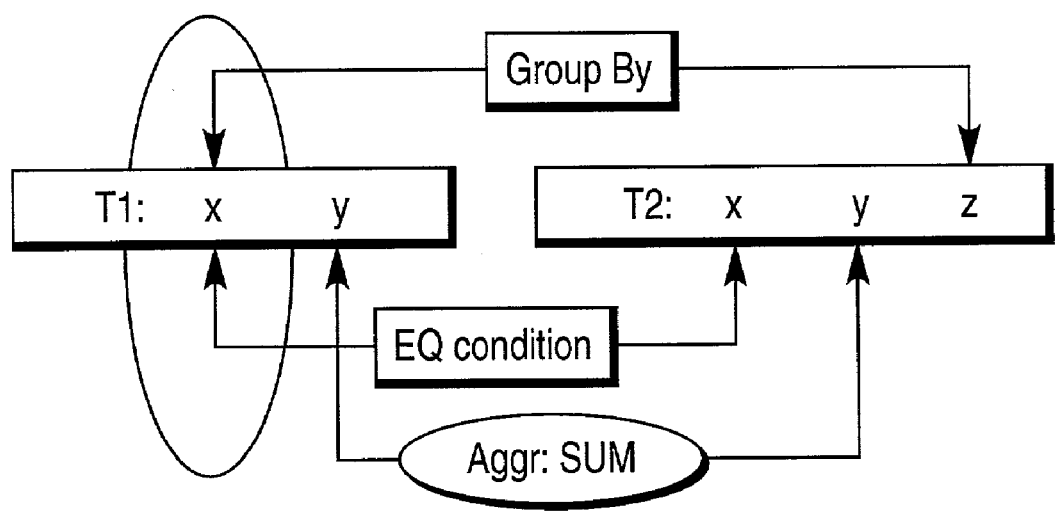
Figure 12:
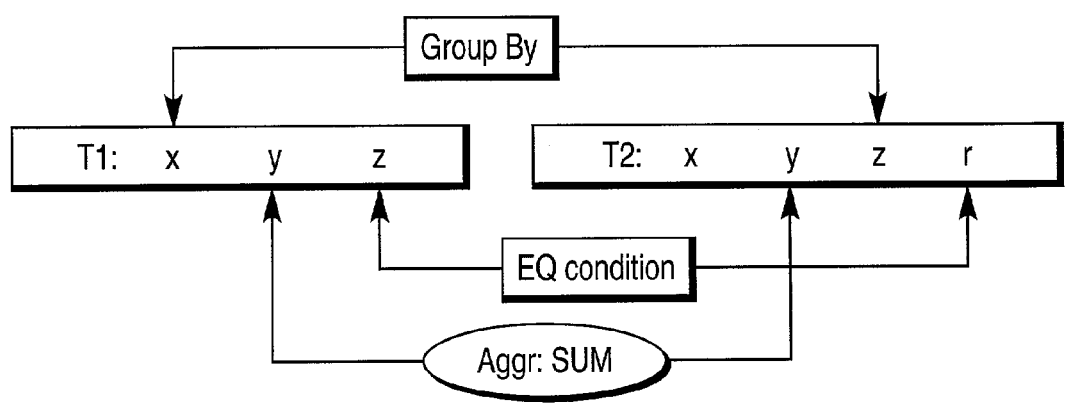

Without loss of generality, three typical cases are considered. The three cases are illustrated in FIGS. 10, 11, and 12. For the first two cases, GbOp is no longer needed after the initial group by on the base tables. Thus, for case 1 (illustrated in FIG. 10), the GbOp on t1'×t2' is not needed. For case 2 (illustrated in FIG. 11), the GbOp on t1'×t2' is not needed. However, for case 3 (illustrated in FIG. 12), the GbOp on t1'×t2' is needed.

In case 1, two attributes are common in the Group-by clause and in the Where clause (EQ condition). In this case GbSet(t1)=GbwSet(t1)={x1}. GbSet(t1) contains the Gb attributes of table t1, and GbwSet(t1) contains the Gbw attributes of table t1. After GbOp is applied on t1, the table t1' has the attribute x1 as a primary key. Similarly, table t2' has x2 as a primary key. The augmented merge join between t1' and t2' under the condition x1=x2 yields a join result with x1(=x2) as a primary key. Hence, GbOp on the join result t1'×t2' is not necessary.

In case 2, one attribute is common in the Group-by clause and Where clause. In this case, GbSet(t1)=GbwSet(t1)={x1}. After GbOp is applied on t1, table t1' has the attribute x1 as a primary key. However, for t2, GbSet(t2)={z2} and GbwSet(t2)={x2}. Hence, GbOp of t2 on {z2, x2}(=GbSet(t2)∪GbwSet(t2)) produces a Group by table t2' having a candidate key {z2, x2}.

The augmented merge join between t1' and t2' under the condition x1=x2 is considered to prove that the set {x1, z2} is the candidate key of the join result. Indeed, since x1 is the primary key of t1, all rows of t1' have different values in x1. Consider one row with x1 equal a value c1. For the other table t2', all rows with x2=c1 are collected. Within these rows, the candidate key {x2, z2} of t2' guarantees that the values z2 in these rows are different. Hence, the join result with x1=c1 has all z2 values different. Since x1 has all different values, the set {x1, z2} is the candidate key for the join result.

In the third case, a counter-example is provided to show that the GbOp operation is necessary on t1'×t2'. Let t1={(3, 2, 1), (3, 2, 2)} and t2={(1, 2, 1), (2, 2, 1)}. After GbOp on t1 and t2, the following results:

{x1, z1} is the candidate key of t1'. All rows of t1' have pairs (x1, z1) as {(3,1), (3, 2)}. Table t1' is as follows:

| x1 | sumy1 | Z1 | Ct1(=count(*)) |
|---|---|---|---|
| 3 | 2 | 1 | 1 |
| 3 | 2 | 2 | 1 |

{z2, r2} is the candidate key of t2'. All rows of t2' have pairs (z2, r2) as {(2,1), (2,2)}. Table t2' is as follows:

| Sumy2 | z2 | r2 | Ct2(=count(*)) |
|---|---|---|---|
| 1 | 2 | 1 | 1 |
| 2 | 2 | 2 | 1 |

The augmented merge join on t1' and t2' under z1=r2 as follows:

| x1 | sumy1 | sumy2 | z2 | Ct1*Ct2 |
|---|---|---|---|---|
| 3 | 2 | 1 | 2 | 1 |
| 3 | 2 | 2 | 2 | 1 |

With the join result, it can be seen that {x1, z2} has duplicate rows. Hence, GbOp on the join result is performed to get the final result: (3, 4, 3, 2, 2).

The following theorem (referred to as "Theorem 1") is defined. Given a query Q and t is one of its tables, the Gb attributes in t' can be dropped (i.e., converted to blank type) if one of the following conditions is satisfied:

GbSet(t)=GbwSet(t) (referred to as "Theorem 1a"), and

GbSetOfQuery=GbSet(t)∪GbwSet(t) (referred to as "Theorem 1b").

Assuming that GbSet(t)=GbwSet(t) the group-by operation is performed under the associated group GbSet(t)∪GbwSet(t)=GbSet(t). Hence, the table t' has GbSet(t) as its candidate key. These are the cases 1 and 2 discussed above. Therefore, group by on GbSet(t) is not necessary. Moreover, GbSetOfQuery⊇GbSet(t) by definition. Hence, group by, if it exists, on any table on GbSetOfQuery is not necessary. Therefore, all Gb attributes of t' can be set to blank.

Assuming that GbSetOfQuery=GbSet(t)∪GbwSet(t), Groupby table t' (the table containing the group by of t under GbSet(t)∪GbwSet(t)) has a candidate key of GbSetOfQuery. Hence, group by on GbSetOfQuery is not necessary on any table having this set of attributes. Therefore, the final group by on the result is not necessary.

The attributes specified in the Group-by clause of the query can be replaced by the attributes specified in the Where clause without changing the result of the query. This is referred to as "Lemma 2." It is assumed that within the Where clause, the conditions are connected by the Boolean AND. Since the equality is set between two attributes in the Where clause, the Group-by clause can be changed to either of the attributes.

For example, the query:

SELECT tm1.x1, tm1.z1, SUM(tm1.y1), SUM(tm3.y3)
FROM tm1, tm2, tm3
WHERE tm1.z1=tm2.y2 AND tm2.z2=tm3.z3
GROUP BY tm1.x1, tm1.z1;

indicates the group by is applied on GbSetOfQuery={x1, z1} at the end of the query execution. However, the Where clause also links the attributes of one table equal to attributes of other tables. In this case, tm1.z1=tm2.y2 and tm2.z2=tm3.z3. Thus, GbSetOfQuery can be changed to {x1, y2} without affecting the result. The two sets {x1, z1} and {x1, y2} are referred to as being group-by equivalent.

Group-by equivalent sets may not be available in the case of OR, instead of AND, in the Where clause. For example, if the Where clause includes x1=y2 OR z2=z3, the replacement of group-by on {x1, z1} by {x1, y2} may not provide a correct result for the query. A counter example is provided in which the contents of tables tm1, tm2, and tm3 are shown below:

| tm1: | | |
|---|---|---|
| x1 | y1 | z1 |
| 1 | 100 | 1 |
| 1 | 101 | 3 |

| tm2: | | |
|---|---|---|
| x2 | y2 | z2 |
|  | 2 | 10 |
|  | 2 | 10 |

| tm3: | | |
|---|---|---|
| x3 | y3 | z3 |
|  | 20 | 10 |
|  | 21 | 10 |

All two rows are selected because z2=z3 even though x1≠y2. Group by on {x1, z1} results in two rows, but group by on {x1, y2} results in one row.

The conditions in Theorem 1a and Theorem 1b are equivalent if there are only 2 tables. This is referred to as "Theorem 2." Denote t1(ai, i=1, ..., n) and t2(bj, j=1, ..., m), where a's and b's are attributes. Let S=GroupByOfQuery be the set of attributes specified by the Group-by clause in the query. Hence, S can be decomposed into two subsets S1 and S2 whose attributes belong to t1 and t2, respectively. That is, S=S1∪S2.

Assume t1 satisfies condition Theorem 1a, GbSet(t1)=GbwSet(t1), and the Where clause links all S1 attributes to some attributes of t2 (referred to as S'1, which is a subset of {bj|j=1, ..., m}). Hence, S'1∪S2=GbwSet(t2)∪Gbset(t2). Therefore, according to Lemma 2, all attributes in Gb(t1) can be replaced by GbwSet(t2). That means the set GroupByOfQuery after the replacement is GbwSet(t2)∪GbSet(t2). Hence, t2 also satisfies Theorem 1b.

Assume that GbSetOfQuery=GbSet(t)∪GbwSet(t) for some table t. Without loss of generality, it is assumed that t1 is such t. Hence, GbSetOfQuery=GbSet(t1)∪GbwSet(t1). Since GbwSet(t1) is a subset of GbSetOfQuery, GbwSet(t1) must link also to attributes of other tables other than t1. Hence, t2 has this set as its GbSet; i.e., GbSet(t1)=GbSet(t2). On the other hand, by definition, GbwSet(t1) must be linked by equality to attributes from other tables. Since there are only two tables, it is known that GbwSet(t1)=GbwSet(t2). Therefore, GbSet(t2)=GbwSet(t2). This is the condition of Theorem 1a.

A counter-example to the example described above is provided below. Dropping a Gb from one table does not guarantee dropping all Gb's from other tables. That means that the following all-or-none property is not true: if one table t' satisfies Theorem 1a, so do all other Gb's.

Figure 13:
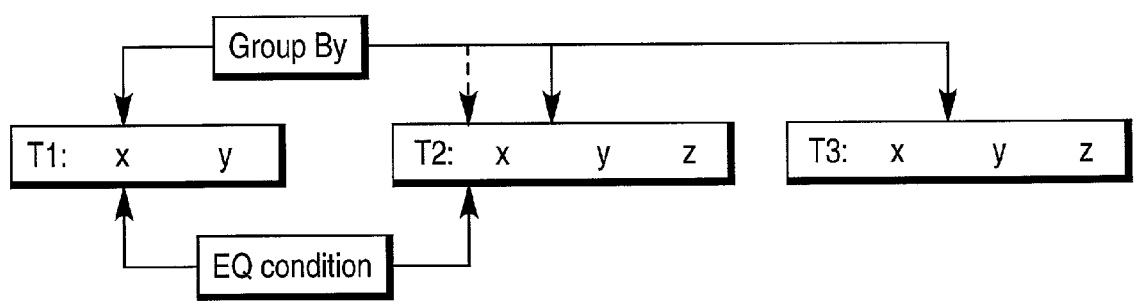
FIGS. 13 and 14 illustrate example cases in which further group-by operations can be dropped.

In the following example (illustrated in FIG. 13), there are three tables t1(x, y), t2(x, y, z), and t3(x, y, z). The group by is applied on the attributes t1.x, t2.y, and t3.y (see the solid arrows with label "GroupBy"). The Where clause specifies the equality restriction t1.x=t2.x (see the solid arrows with the label EQ). Therefore, the group by on t1.x may be substituted by t2.x (see the broken arrow). In this case, t1 satisfies the Theorem 1a condition (Lemma 2) and none of t1, t2, and t3 satisfy the Theorem 1b condition (Lemma 2). Therefore, dropping the group-by sequences of t1, t2, or t3 is not acceptable.

Given a query Q, if one table t satisfies the condition of Theorem 1b, then all other tables have the same property. This is referred to as "Theorem 3." Condition Theorem 1b specifies: GbSetOfQuery=GbSet(t)∪GbwSet(t). Theorem 3 is valid not only for Regular tables but also for Groupby tables.

Figure 14:
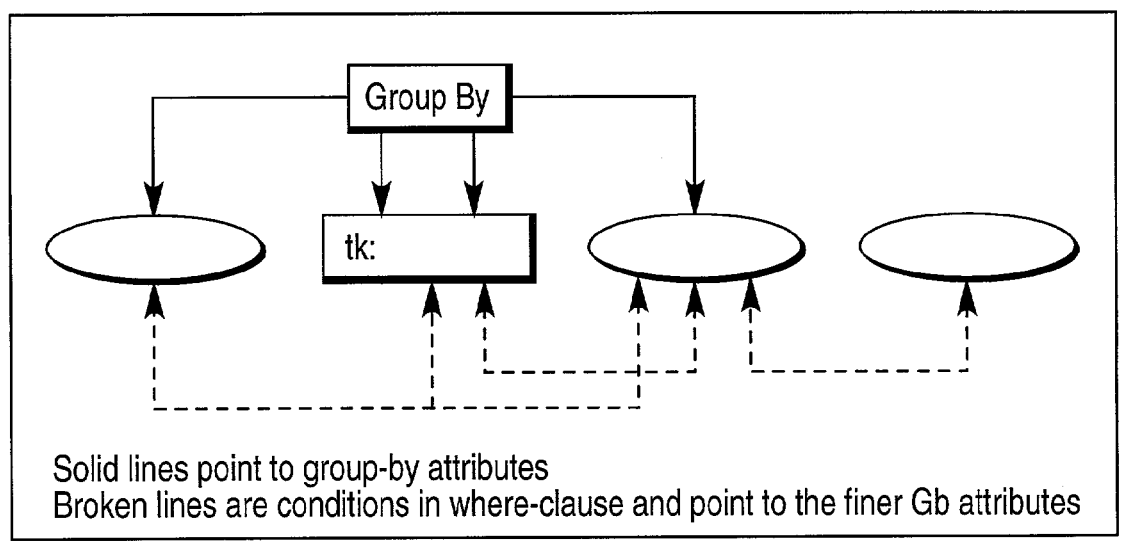

Let t1, t2, ..., tn be base tables. Their local group-by's are denoted t1', t2', ..., tn', respectively. Let tk be the table that satisfies the Theorem 1b condition (as illustrated in FIG. 14). Let S1=GbSet(tk) and S2=GbwSet(tk). Hence, S1∪S2 is the set of group-by attributes specified by the query. Since S2 is formed by the conditions in the Where clause, there is some linking between tk and other tables. Groupby table tk' is the local group-by of tk on S1∪S2. Hence, tk' has all rows different on S1∪S2 (candidate key).

For each ti, i≠k, there are two cases (with or without group-by attributes). In the first case, the ti group-by attributes must have conditions (Where clause) to transfer to tk. Table ti in this case satisfies condition Theorem 1a. Hence, ti' (the group-by on ti) has a candidate key on its set of group-by attributes. However, this candidate key is a subset of S1∪S2. Therefore, the join between ti' and tk' makes all rows different in S1∪S2 and there is no further group-by necessary.

In the second case, the table ti has no group-by attribute, but it is possible there is a condition to link it to another table g. In this case, finer group by on the condition attribute makes it possible to join with another table g that is already grouped by the same attribute. Lemma 1 (discussed above) indicates drop on this finer group-by. Further, a join of ti' with tk' retains S1∪S2 as the candidate key.

Thus, it is noted that the condition in Theorem 1a is useful to conclude that the final GbOp on a result table is not necessary. The condition in Theorem 1b is useful for indicating that no further GbOp is needed during the searching for an optimal path.

The following discusses the rules after each binary join is performed. Given two tables t1 and t2 (they can be original tables from the query or the intermediate tables from previous joins), let r be the result table after the join of t1 and t2. After a join, the result table is of type Regular if both joined tables are of type Regular; otherwise, it is of type Groupby. The finer-group-by sequence of r is dropped. That means all values in the sequence are zeros.

The group-by sequence of r is carried from the group-by sequence of t1 and the group-by sequence of t2 (that means the sequence is a concatenation of the group-by sequences of t1 and t2) unless the condition of Theorem 1 is met. In this exception case, the further group-by sequence is dropped, which means no further group-by is necessary.

There is at most one COUNT attribute in the aggregation sequence for each table including t1, t2, and the result r. The aggregation sequence of r is of the concatenation of the aggregation sequence of t1 and the aggregation sequence t2. Moreover, the SUM (or other aggregate) attributes of one table must be augmented by the COUNT attribute from other table, and the COUNT attribute is augmented by the COUNT attribute of the other table.

As discussed above, one of the acts performed is checking (at 218 in FIG. 2) to determine if a group-by operation of the result (of the join of all tables specified by a join query) is needed. The mechanism and algorithm for performing this checking is discussed below. Also, although discussed in the context of checking to see if the last group-by operation is needed, the same mechanism and algorithm can be applied to determine if a group by of an intermediate result is needed. By skipping an unnecessary group-by operation, whether an intermediate group-by or final group-by operation, savings can be achieved in terms of reducing the processing time as well as the amount of resources consumed by the database system in performing a join.

To enable the determination of whether the last group-by operation or an intermediate group-by operation can be skipped, a data structure 401 (FIG. 15) is defined to associate data elements with one or more attributes of a table 406. The data elements in the data structures provide an indication to the database system regarding whether intermediate group-by operations and/or the final group-by operation can be skipped. The values of the data elements are updated in response to various database operations, including partial group-by operations, join operations, and other operations. Based on the updated values of the data elements, the database system is able to determine if certain partial group-by operations can be skipped.

In the example, a data element 402 is associated with attribute A 408 of table 406, while a data element 404 is associated with attribute B 410 of table 406. Other data elements in the data structure 401 are associated with other attributes in the table 406. For other tables in the storage 400, other data elements are associated with the attributes of such other tables. One example of a data element in the data structure is an array made up of one or plural data bits that can have several values to indicate different conditions, as explained below.

Each data element can have one of multiple values. In one example, the possible values are Value_1, Value_2, and Value_3. If the data element has Value_1, then the attribute is part of a candidate key (e.g., unique primary index or primary key). A candidate key or primary key is a key containing one or more attributes of a table that uniquely identifies each row of the table. In the ensuing discussion, "candidate key" and "primary key" are used interchangeably.

If the data element has Value_2, then the corresponding attribute is a grouping field in a group-by clause or Where clause of a query. A "grouping field" refers to an attribute that is used to perform either a partial or final group-by operation. As discussed above, a partial group by of a table ti is performed on grouping fields derived from the group-by clause and Where clause of the original query. For example, given a query SELECT x1, z3, SUM(y1), SUM(y3)
FROM t1, t2, t3
WHERE z1=y2 AND z2=z3
GROUP BY x1, z3;

In performing the join plan, partial group by's are performed on tables t1, t2, and t3, as discussed above. In performing the partial group by of t1, the grouping fields include x1 and z1 from the group-by clause and Where clause, respectively. The partial group by of t2 involve grouping fields y2 and z2 in the Where clause of the query. The partial group by of t3 involves grouping field z3 from the group-by clause.

If the data element in the data structure 401 has Value_3, then the corresponding attribute has changed its status from being part of a candidate or primary key (corresponding to Value_1) due to the presence of a relational operator (such as a join operator). In other embodiments, other data values can also be specified to indicate other predefined conditions.

Figure 16A:
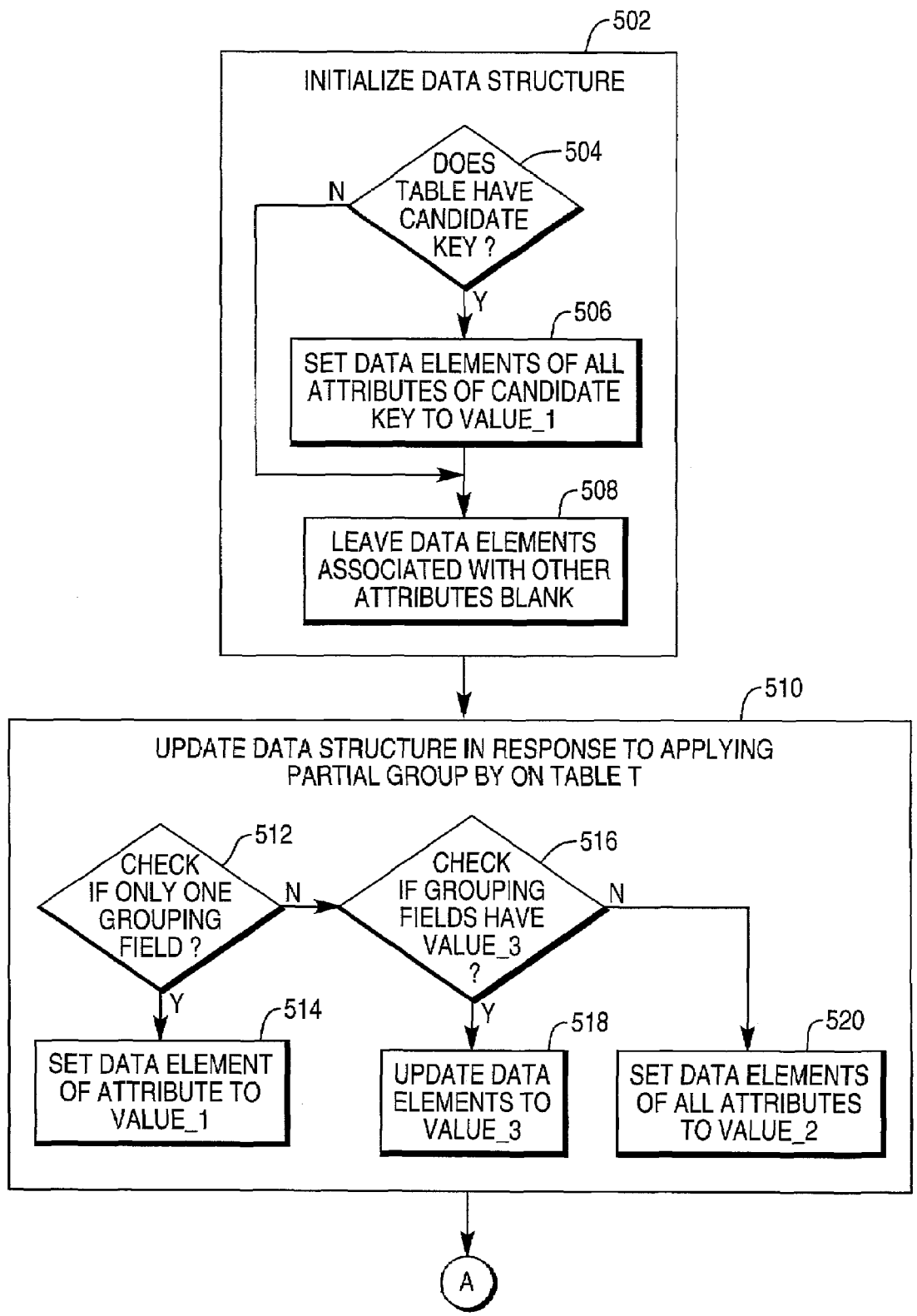
FIGS. 16A–16B are a flow diagram of a process that uses the data structure of FIG. 15 to skip group-by operations.
Figure 16B:
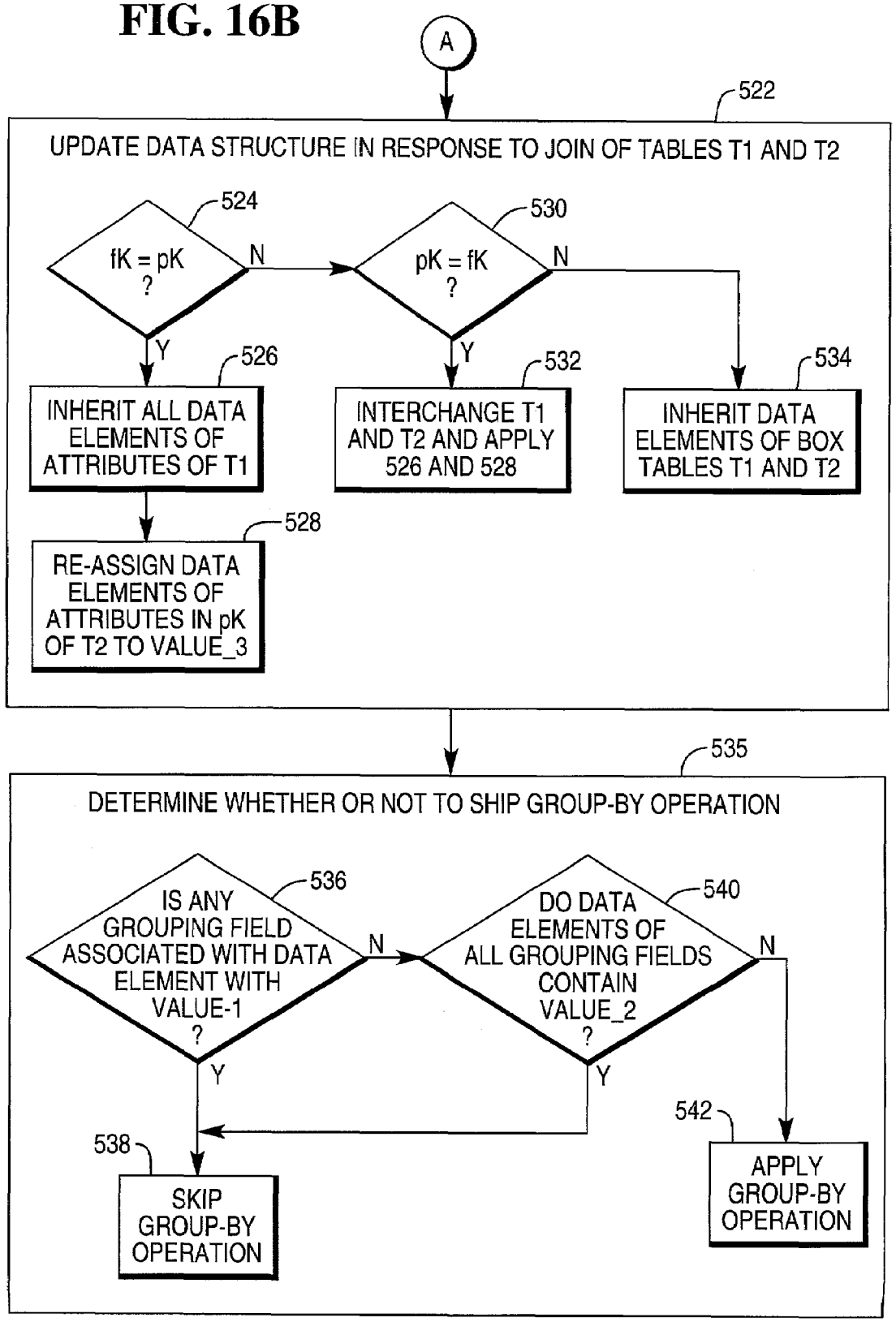

FIGS. 16A–16B show a process according to one embodiment for checking to see if the last group-by operation or an intermediate group-by operation can be skipped. The determination of whether the last or an intermediate group-by operation can be skipped is performed by the optimizer module 20 (FIG. 1).

Figure 15:
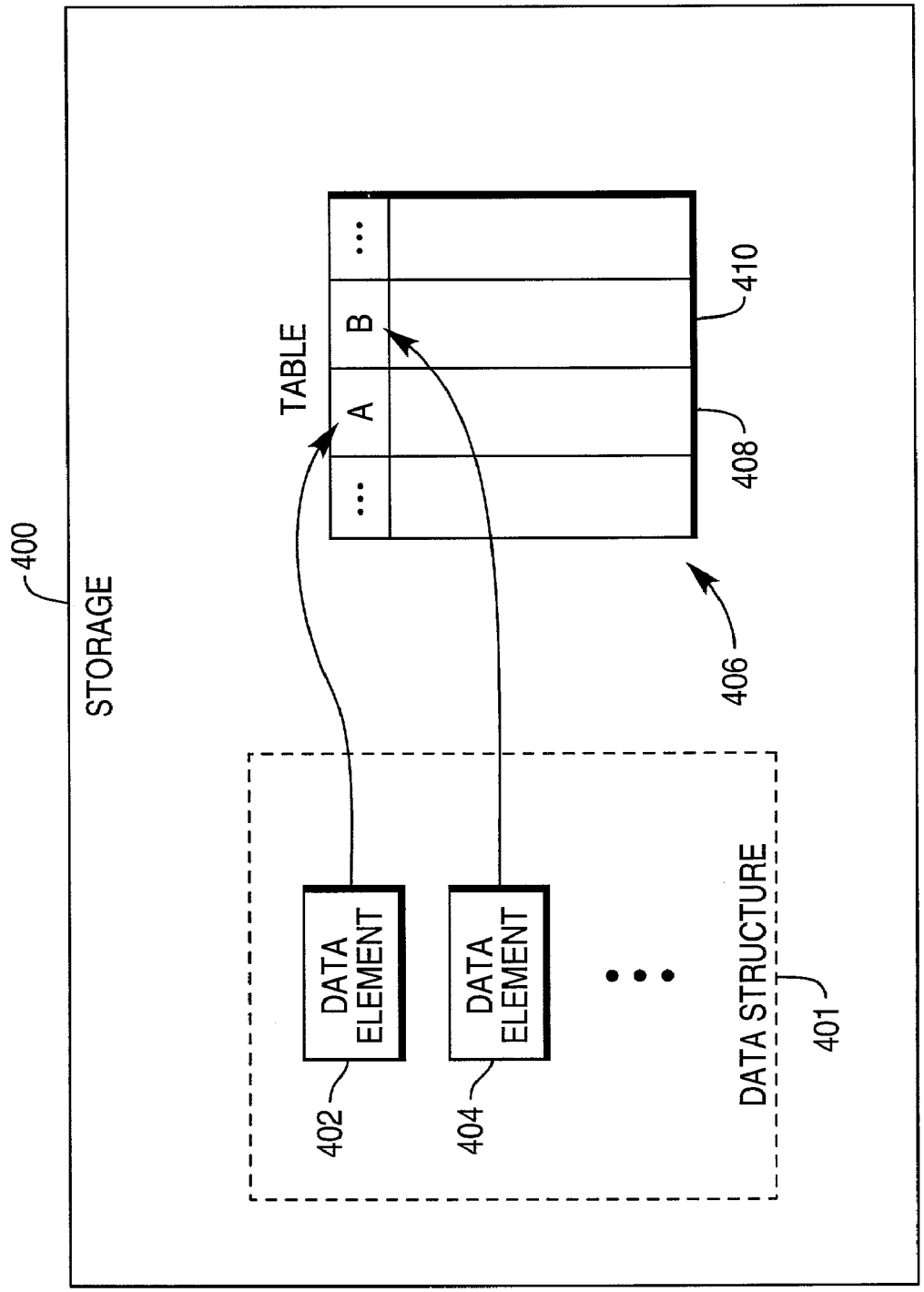
FIG. 15 illustrates a data structure containing data elements that enable the database system to determine if a group-by operation can be skipped in a join plan.

The optimizer module 20 initializes (at 502) the data structure 401 (FIG. 15). This is performed by determining (at 504) if the table has a candidate key. If so, then all data elements in the data structure 401 corresponding to attributes of the candidate key are set (at 506) to Value_1. However, data elements of other attributes (non-candidate key attributes) are left (at 508) blank at this time.

A table can also potentially include more than one candidate key. If that is the case, then a different value is pre-assigned in the data structure 401 to correspond to multiple candidate keys. For example, the data elements corresponding to attributes of the other candidate keys can be assigned to a Value_4 and, if needed, other values.

The data structure 401 is updated (at 510) in response to application of a partial group-by operation on a table T. The update is performed as follows. The optimizer module 20 checks (at 512) to determine if there is only one grouping field (attribute) for table T specified in either the group-by clause or Where clause of a given query. If there is only one grouping field, then the data element corresponding to this attribute is set (at 514) to Value_1. If there are more than one grouping field, the optimizer module 20 checks (at 516) to determine if all the grouping fields are associated with data elements that have Value_3. If so, then the data element of each of the grouping fields is upgraded to Value_1. This is due to the fact that such attributes were at some point part of a candidate key (since they were originally associated with data elements having Value_1 that have subsequently been changed to Value_3 as a result of a join operation). As explained below, this change from Value_1 to Value_3 was made due to the fact that the join may cause duplicate values to occur in the result, thereby rendering the candidate key to no longer be unique. However, after the group by, duplicates are removed and the candidate key is again unique for each row.

If neither condition 512 nor 516 is satisfied, then the optimizer module 20 sets (at 520) the data elements of all attributes (the grouping fields) to Value_2. In effect, as part of the partial group-by operation on a table T, the grouping fields are set to either Value_1 or Value_2, depending on the conditions noted above.

The optimizer module 20 also updates (at 522) the data structure 401 in response to a join of two tables (table T1 and table T2). In updating the data structure at 522, the optimizer module 20 checks (at 524) to see if a search condition of the join of tables T1 and T2 is fK=pK, where fK is a foreign key of table T1 and pK is the primary key of table T2. As noted above, the primary key pK (or candidate key) contains one or more attributes that uniquely identify each row of a table, in this example table T2. A foreign key fK is a key that exists somewhere in the database system as a primary key. Thus, the foreign key fK in table T1 is the primary key in table T2. While duplicate values of a primary key are not allowed, duplicate values of a foreign key are allowed (in table T1 in the example shown). In response to detecting the search condition fK (of T1) equal to pK (of T2), all attributes in the search result (of the join of the tables T1 and T2) inherit (at 526) the data element values of table T1. However, the data element(s) associated with attribute(s) of the primary key pK (inherited from table T2) are re-assigned (at 528) to Value_3 from Value_1, since the primary key of T2 may no longer be unique in the result of the join of tables T1 and T2.

If fK=pK is not the condition, then the optimizer module 20 determines (at 530) if the condition pK (primary key of table T1) is equal to fK (the foreign key of table T2). If so, then the designation of T1 and T2 is switched (at 532) and the acts at 526 and 528 are performed. If neither condition 524 nor 530 is satisfied, then the data element values for attributes in the join result are inherited (at 534) from both tables T1 and T2. This last condition also applies to situations where the primary key pK is in table T1 or table T2 but not in the join condition.

After the updates of the data structure specified above in response to partial group-by operations or joins of tables, the optimizer module 20 determines (at 535) whether an intermediate or last group-by operation can be skipped. This is performed by determining (at 536) if the data element of any grouping field has Value_1. If so, then the intermediate or last group-by operation under consideration can be skipped (at 538). A grouping field that is associated with a data element that is equal to Value_1 indicates that the primary key is in the grouping field. Therefore, performing another group by in this case will not reduce the number of rows in the result and thus, performing the extra group-by operation is a wasted step.

If condition 536 is not satisfied, then the optimizer module 20 determines (at 540) if the data elements of all grouping fields contain Value_2. If so, then the intermediate or last group-by operation can be skipped (at 538). The act performed at 538 includes providing some type of an indication that the group-by operation can be skipped.

If neither condition 536 nor 540 is satisfied, then the optimizer module 20 proceeds to indicate (at 542) that the intermediate or last group-by operation is to be performed.

Example queries where the process described in connection with FIGS. 16A–16B is applicable to skip the last group-by operation is discussed below. One example query is as follows:

SELECT L_SUPPKEY, SUM(L_QUANTITY), SUM(PS_AVAILQTY)
FROM LINEITEM, PARTSUPP
WHERE L_SUPPKEY=PS_SUPPKEY
GROUP BY L_SUPPKEY;

In the query above, LINEITEM is one table and PARTSUPP is another table. The search condition is L_SUPPKEY=PS_SUPPKEY. The grouping field specified in the group-by clause is the attribute L_SUPPKEY.

The join plan generated by the optimizer module 20 is (LINEITEM'×PARTSUPP'), where the apostrophe denotes a partial group-by operator. This join plan does not include the last group-by operation on the result of LNEITEM'×PARTSUPP'.

In performing the partial group by LINEITEM', the grouping field is L_SUPPKEY. Since L_SUPPKEY is the only grouping field, condition 512 is satisfied and, as a result, the data element for L_SUPPKEY is assigned to VALUE_1. Similarly, in performing the partial group by PARTSUPP', the grouping field includes one attribute PS_SUPPKEY. As a result, the data element for the attribute PS_SUPPKEY is also set to VALUE_1.

Next, a join of LINEITEM' and PARTSUPP' is performed. Since a group by of table PARTSUPP was performed with the grouping field PS_SUPPKEY, the attribute PS_SUPPKEY is the primary key for the table PARTSUPP. Therefore, the search condition, L_SUPPKEY=PS_SUPPKEY satisfies 524 in FIG. 16B (i.e., fK=pK), where L_SUPPKEY is the foreign key. Consequently, the data element for the attribute L_SUPPKEY of table LINEITEM' (T1) is passed to the join result without change (the data element has VALUE_1). However, the data element for attribute PS_SUPPKEY of table PARTSUPP' (T2) is changed from VALUE_1 to VALUE_3.

In determining if the group by on (LINEITEM'×PARTSUPP') can be skipped, the value of the data element of the grouping field (L_SUPPKEY) is determined. Since L_SUPPKEY has VALUE_1, condition 536 is satisfied, so the last group by can be skipped.

Another example query in which the process of FIGS. 16A–16B is applicable is shown below.

SEL B1,C1,SUM(T1.FLOAT_1), SUM(T2.FLOAT_2), SUM(T3.FLOAT_3)
FROM T1,T2,T3
WHERE B1=B2 AND B2=B3
GROUP BY B1,C1;

Without the process shown in FIGS. 16A–16B, the join plan would have been the following: (T2×T3')'×T1')', in which the last group-by operation is applied on the result ((T2×T3')'×T1'). Since the attributes in the group-by clause covers the attributes specified in the Where clause (containing the join fields), the last group-by operation can be skipped.

In the join plan above, a partial group by is performed on table T3. The grouping field for this partial group by includes C3. As a result, the data element for C3 is assigned to VALUE_1. Another operation is the join of T2 and T3' (T2×T3'). The second condition B2=B3 is of the form fK=pK, since B3 uniquely identifies each row of T3' due to the partial group by above. As a result, the data element for B2 is passed to the join result unchanged. However, the data element for B3 of T3' is changed from VALUE_1 to VALUE_3.

Also, the check performed at 536 and 540 (FIG. 16B) is performed to determine if a partial group by of (T2×T3') needs to be performed, where the grouping fields include B2 and B3. Since the join based on the search condition B2=B3 was performed to obtain T2×T3', the data elements for both B2 and B3 have VALUE_3. As a result, neither condition 536 nor 540 is satisfied, so the partial group by of (T2×T3') needs to be performed. Since the partial group by of (T2×T3') involves grouping fields B2, B3 that have VALUE_3, the data elements for such attributes B2, B3 are changed to VALUE_1 (according to condition 516 being satisfied).

A partial group by is also performed on T1, with grouping fields B1 and C1. The data elements for these grouping fields B1, C1 are assigned VALUE_2 (at 520 in FIG. 16A).

Next, the join (T2×T3')'×T1' is performed. The join condition is B1=B2, where B1 is the primary key of T1'(due to the partial group by performed on T1). Therefore, the search condition is of the type pK=fK, which satisfies condition 530 in FIG. 16B. Therefore, the order of (T2×T3')' and T1' is swapped to achieve the condition fK=pK (524 in FIG. 16A). As a result, the data elements of B1, C1 (having VALUE_2) of the table T1 are passed to the join results, whereas the data element for B2 of table (T2×T3')' is changed from VALUE_1 to VALUE_3.

Finally, it is determined if the last group-by operation of (T2×T3')'×T1' is needed. The grouping fields are B1, C1, each having data elements with VALUE_2. Therefore, the last group by can be skipped.

Instructions of the various software routines or modules discussed herein (such as the access modules 22 and optimizer module 20) are stored on one or more storage devices in the corresponding systems and loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software modules and layers) are stored in respective storage units, which can be implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software modules or layers are loaded or transported to each device or system in one of many different ways. For example, code segments including instructions stored on floppy disks, CD or DVD media, a hard disk, or transported through a network interface card, modem, or other interface device are loaded into the device or system and executed as corresponding software modules or layers. In the loading or transport process, data signals that are embodied in carrier waves (transmitted over telephone lines, network lines, wireless links, cables, and the like) communicate the code segments, including instructions, to the device or system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a database system, comprising:
   storing a predefined data structure and plural tables;
   performing a join plan that involves the plural tables; and
   determining if a first group-by operation can be skipped in response to data elements in the predefined data structure,
   wherein performing the join plan comprises performing one or more joins of the plural tables and at least one partial group-by operation on a table, the method further comprising updating values of the data elements in the predefined data structure in response to performing the one or more joins and partial group-by operations.

2. The method of claim 1, further comprising associating each data element in the predefined data structure with an attribute of one of the tables.

3. The method of claim 2, wherein updating a value of each data element comprises assigning one of plural values to the data element.

4. The method of claim 3, wherein assigning one of plural values to the data element comprises assigning a first value to the data element in response to an attribute corresponding to the data element being part of a candidate key.

5. The method of claim 4, wherein assigning one of plural values to the data element comprises assigning a second value to the data element in response to an attribute corresponding to the data element being part of a grouping field.

6. The method of claim 4, wherein updating a value of each data element comprises changing the value of the data element from the first value to another value in response to a join of tables.

7. The method of claim 6, further comprising skipping the first group-by operation in response to values of the data elements in the data structure.

8. The method of claim 7, wherein skipping the first group-by operation is performed in response to any grouping field of the first group-by operation being associated with a data element having the first value.

9. The method of claim 8, wherein skipping the first group-by operation is performed in response to all grouping fields of the first group-by operation being associated with corresponding data elements each having the second value.

10. The method of claim 9, further comprising performing the first group-by operation if none of the grouping fields of the first group-by operation is associated with a data element having the first value and not all grouping fields of the first group-by operation being associated with corresponding data elements each having the second value.

11. An article comprising at least one storage medium containing instructions that when executed cause a database system to:
    store a data structure containing data elements associated with corresponding attributes of a table;
    update the data elements of the data structure in response to performing one of a partial group-by operation on the table and a join operation involving the table; and
    determine whether or not a certain group-by operation on a result of a join involving the table can be skipped based on values of the data elements of the data structure.

12. The article of claim 11, wherein the instructions when executed cause the database system to update the data elements by assigning values to the data elements in response to performing the partial group-by operation or the join operation.

13. The article of claim 12, wherein assigning the values comprises assigning one of plural values.

14. The article of claim 11, wherein the instructions when executed cause the database system to skip the certain group-by operation in response to the values of the data elements in the data structure.

15. The article of claim 11, wherein updating the data elements comprises assigning one of plural values to one of the data elements.

16. The article of claim 15, wherein assigning one of plural values to the one data element comprises assigning a first value to the one data element in response to an attribute corresponding to the one data element being part of a candidate key.

17. The article of claim 16, wherein assigning one of plural values to the one data element comprises assigning a second value to the one data element in response to an attribute corresponding to the one data element being part of a grouping field.

18. The article of claim 17, wherein updating the data elements comprises changing the value of the one data element from the first value to another value in response to a join of tables.

19. A database system comprising:
a storage to store a predefined data structure and plural tables; and
a controller to perform a join plan involving the plural tables and to check if a given group-by operation in the join plan can be skipped based on values in the predefined data structure;
wherein the join plan includes partial group-by operations and join operations, the controller to further update values in the predefined data structure based on the partial group-by operations and join operations being performed.

20. The database system of claim 19, the controller to assign a first value in the data structure in response to a partial group-by operation, and to assign a second value in the data structure in response to a join operation.

* * * * *